US008169465B2

(12) United States Patent  
Mizobuchi et al.

(10) Patent No.: US 8,169,465 B2
(45) Date of Patent: May 1, 2012

(54) 3D VIDEO PROCESSOR AND 3D VIDEO PROCESSING METHOD

(75) Inventors: Tomoki Mizobuchi, Kyoto (JP); Yohei Ikeuchi, Osaka (JP); Shoji Kawamura, Osaka (JP); Kengo Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/177,118

(22) Filed: Jul. 6, 2011

(65) Prior Publication Data

US 2011/0261159 A1   Oct. 27, 2011

Related U.S. Application Data

(63) Continuation of application No. PCT/JP2010/006268, filed on Oct. 22, 2010.

(30) Foreign Application Priority Data

Nov. 10, 2009   (JP) ................................ 2009-257553

(51) Int. Cl.
*H04N 15/00*   (2006.01)

(52) U.S. Cl. ................ 348/43; 348/46; 348/51; 348/53; 348/54; 348/55

(58) Field of Classification Search ............. 348/43, 348/46, 51, 53, 54, 55
See application file for complete search history.

(56) References Cited

U.S. PATENT DOCUMENTS

| 2010/0220175 A1* | 9/2010 | Claydon et al. ................. 348/43 |
| 2010/0238267 A1* | 9/2010 | Izzat et al. ..................... 348/43 |
| 2010/0245548 A1* | 9/2010 | Sasaki et al. ................... 348/51 |
| 2010/0245666 A1* | 9/2010 | Rosen ........................... 348/473 |

FOREIGN PATENT DOCUMENTS

| JP | 11-289555   | 10/1999 |
| JP | 2003-319419 | 11/2003 |
| JP | 2004-274125 | 9/2004  |
| JP | 2005-236925 | 9/2005  |

OTHER PUBLICATIONS

International Search Report in corresponding PCT/JP2010/006268, dated Dec. 14, 2010.

\* cited by examiner

*Primary Examiner* — Shawn An

(74) *Attorney, Agent, or Firm* — Greenblum & Bernstein, P.L.C.

(57) ABSTRACT

A 3D video processor that outputs a left-eye image and a right-eye image to be superimposed on main video includes: a left-eye object processing unit that outputs the left-eye image; a right-eye object processing unit that outputs the right-eye image; and an image output control unit that controls the left-eye object processing unit and the right-eye object processing unit so that the left-eye image and the right-eye image are synchronously outputted. The left-eye object processing unit determines whether or not image output preparation of the left-eye image is completed. The right-eye object processing unit determines whether or not image output preparation of the right-eye image is completed. The image output control unit instructs to skip the output of both the left-eye image and the right-eye image, when the image output preparation of one of the left-eye image and the right-eye image is not completed.

18 Claims, 19 Drawing Sheets

3D VIDEO PROCESSOR AND 3D VIDEO PROCESSING METHOD

CROSS REFERENCE TO RELATED APPLICATION

This is a continuation application of PCT application No. PCT/JP2010/006268 filed on Oct. 22, 2010, designating the United States of America.

BACKGROUND OF THE INVENTION (1) Field of the Invention

The present invention relates to a three-dimensional (3D) video processor, and in particular relates to a 3D video processor that superimposes an object image on 3D main video.

(2) Description of the Related Art

A technique of displaying video in 3D so as to convey a stereoscopic perception to a viewer is conventionally known. For example, a 3D video display apparatus displays two images (a left-eye image and a right-eye image) having parallax. The 3D video display apparatus controls the display so that the left-eye image enters the viewer's left eye and the right-eye image enters the viewer's right eye, with it being possible to convey a stereoscopic perception to the viewer.

A superimposed display technique of superimposing an object image such as a subtitle on main video such as a movie is also known. Progress of this superimposed display technique spurs development of a technique of correcting text when subtitle data is corrupted due to a transmission error or the like (for example, see Japanese Unexamined Patent Application Publication No. 2005-236925).

In view of this, the 3D display technique and the object image superimposed display technique may be combined to realize a technique of displaying not only main video but also subtitles in 3D.

SUMMARY OF THE INVENTION

However, the conventional technique mentioned above has a problem of causing discomfort to the viewer who is watching 3D video, when an image to be outputted is not prepared by a predetermined image output time. This is explained in detail below.

When an object image cannot be decoded in time or cannot be correctly decoded due to an error in a stream, the image to be outputted is not prepared by a predetermined image output time. In a conventional 3D video processor, when the image output preparation of one of a left-eye object image and a right-eye object image is not completed and only the image output preparation of the other one of the left-eye object image and the right-eye object image is completed, only the image for which the image output preparation is completed is outputted. As a result, the object image to be outputted will end up being displayed in two dimensions (2D).

For example, in the technique described in Japanese Unexamined Patent Application Publication No. 2005-236925, when the object image is composed of text, correction can be made even in the case of data corruption. When the object image is composed of graphics such as bitmapped graphics, however, management information of the object image cannot be corrected. Such data that cannot be corrected is discarded. In this case, too, when data of one of the left-eye object image and the right-eye object image is discarded, only the object image corresponding to the data which is not discarded will end up being displayed in 2D.

Such a state where the object image is displayed in 2D while the main video is displayed in 3D may cause discomfort to the viewer.

The present invention has been made to solve the above problem, and has an object of providing a 3D video processor and a 3D video processing method that can alleviate the viewer's discomfort that 2D display appears during 3D video.

To achieve the stated object, the 3D video processor according to the present invention is a 3D video processor that outputs a left-eye object image and a right-eye object image which have parallax and are to be superimposed on main video, the 3D video processor including: a first image processing unit that performs image output preparation of a first image and outputs the first image, the first image being one of the left-eye object image and the right-eye object image; a second image processing unit that performs image output preparation of a second image and outputs the second image, the second image being an other one of the left-eye object image and the right-eye object image; and an image output control unit that controls the first image processing unit and the second image processing unit so that the first image and the second image are synchronously outputted, wherein the first image processing unit includes a first determination unit that determines whether or not the image output preparation of the first image is completed, the second image processing unit includes a second determination unit that determines whether or not the image output preparation of the second image is completed, and the image output control unit instructs the first image processing unit and the second image processing unit to skip the output of both the first image and the second image, when one of the first determination unit and the second determination unit determines that the image output preparation of a corresponding one of the first image and the second image is not completed.

Hence, the 3D video processor and the 3D video processing method according to the present invention can alleviate the viewer's discomfort.

FURTHER INFORMATION ABOUT TECHNICAL BACKGROUND TO THIS APPLICATION

The disclosure of Japanese Patent Application No. 2009-257553 filed on Nov. 10, 2009 including specification, drawings and claims is incorporated herein by reference in its entirety.

The disclosure of PCT application No. PCT/JP2010/006268 filed on Oct. 22, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Detailed description of a 3D video processor and a 3D video processing method according to the present invention is given below by way of embodiments, with reference to drawings.
(First Embodiment)

A 3D video processor according to a first embodiment of the present invention is a 3D video processor that outputs a left-eye object image and a right-eye object image which have parallax and are to be superimposed on main video, the 3D video processor including: a first image processing unit that performs image output preparation of a first image and outputs the first image, the first image being one of the left-eye object image and the right-eye object image; a second image processing unit that performs image output preparation of a second image and outputs the second image, the second image being an other one of the left-eye object image and the right-eye object image; and an image output control unit that controls the first image processing unit and the second image processing unit so that the first image and the second image are synchronously outputted. The first image processing unit includes a first determination unit that determines whether or not the image output preparation of the first image is completed, the second image processing unit includes a second determination unit that determines whether or not the image output preparation of the second image is completed, and the image output control unit instructs the first image processing unit and the second image processing unit to skip the output of both the first image and the second image, when one of the first determination unit and the second determination unit determines that the image output preparation of a corresponding one of the first image and the second image is not completed.

A structure of the 3D video processor according to the first embodiment is described first.

Figure 1:
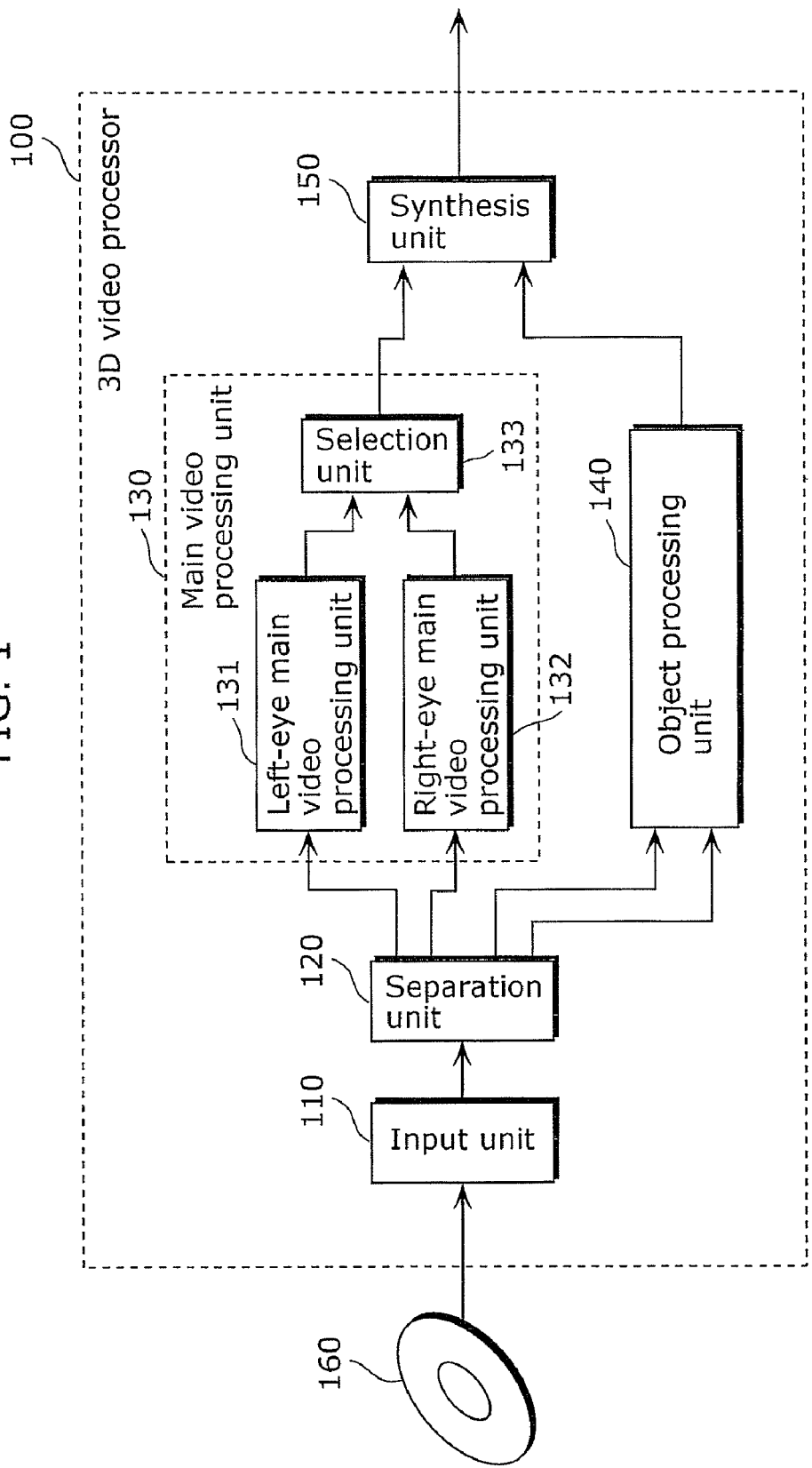
FIG. 1 is a block diagram showing a structure of a 3D video processor according to a first embodiment of the present invention.

FIG. 1 is a block diagram showing a structure of a 3D video processor 100 according to the first embodiment. The 3D video processor 100 according to the first embodiment obtains a coded stream representing coded 3D video, and decodes the obtained coded stream to generate and output 3D video. The coded stream is a stream generated by coding main video such as a movie and an object image such as a subtitle to be superimposed on the main video.

As shown in FIG. 1, the 3D video processor 100 includes an input unit 110, a separation unit 120, a main video processing unit 130, an object processing unit 140, and a synthesis unit 150.

The input unit 110 obtains the coded stream. For instance, the input unit 110 obtains the coded stream from a recording medium 160 on which the coded stream is recorded. The obtained coded stream is stored, for example, in a buffer (not shown) or the like.

The coded stream is generated by coding each of the main video and the object image and multiplexing a coded main video stream representing the coded main video and a coded object stream representing the coded object image. The main video is made up of left-eye main video that is to enter the viewer's left eye and right-eye main video that is to enter the viewer's right eye. For example, the main video is video of a movie, a television program, or the like.

The object image is made up of a left-eye object image that is to enter the viewer's left eye and a right-eye object image that is to enter the viewer's right eye. For example, the object image is a movie subtitle, a symbol, a figure, or a menu image. The menu image is an image representing a selection button and the like.

Examples of the recording medium 160 include an optical disc such as a BD (Blu-ray Disc), a magnetic disk such as a HDD (Hard Disk Drive), a nonvolatile memory, and so on.

Instead of obtaining the coded stream from the recording medium 160, the input unit 110 may obtain the coded stream from a video recording and reproduction apparatus (such as a digital video recorder) or the like connected by a HDMI (High Definition Multimedia Interface) cable or the like, via the HDMI cable. Alternatively, the input unit 110 may obtain the coded stream via the Internet or a broadcast wave of terrestrial digital television broadcasting, satellite digital television broadcasting, and the like.

The separation unit 120 separates the coded stream obtained by the input unit 110, into the left-eye main video, the right-eye main video, the left-eye object image, and the right-eye object image. In detail, the left-eye object image and the right-eye object image are separated as independent streams (a left-eye object stream and a right-eye object stream). Hereafter, the left-eye object stream and the right-eye object stream are simply referred to as a left-eye stream and a right-eye stream, respectively.

Likewise, the left-eye main video and the right-eye main video are separated as independent streams (a left-eye main video stream and a right-eye main video stream). Here, the left-eye main video stream and the right-eye main video stream may have a reference relation. As an example, an image included in the right-eye main video stream may be coded with reference to an image included in the left-eye main video stream.

The left-eye main video (left-eye main video stream) and the right-eye main video (right-eye main video stream) are passed to the main video processing unit 130. The left-eye object image (left-eye stream) and the right-eye object image (right-eye stream) are passed to the object processing unit 140.

Note that the left-eye stream and the right-eye stream can be decoded independently of each other, and also are defined to have the same structure. The same structure means that a plurality of sets of information in a header included in the left-eye stream are the same as a plurality of sets of information in a header included in the right-eye stream.

Here, the left-eye main video stream, the right-eye main video stream, the left-eye stream, and the right-eye stream may be obtained separately. As an example, the left-eye main video stream and the right-eye main video stream are obtained from the recording medium 160, whereas the left-eye stream and the right-eye stream are obtained via the Internet. In this case, the separation unit 120 passes each obtained stream to either the main video processing unit 130 or the object processing unit 140, according to the type of the obtained stream.

The main video processing unit 130 processes the left-eye main video and the right-eye main video, to generate the main video displayed in 3D. As shown in FIG. 1, the main video processing unit 130 includes a left-eye main video processing unit 131, a right-eye main video processing unit 132, and a selection unit 133.

The left-eye main video processing unit 131 decodes the left-eye main video stream representing the left-eye main video in coded form, to generate the left-eye main video. The generated left-eye main video is stored, for example, in a memory such as a DRAM (Dynamic Random Access Memory). The left-eye main video processing unit 131 may change an image size, a frame rate, and a scanning mode of the generated left-eye main video.

The right-eye main video processing unit 132 decodes the right-eye main video stream representing the right-eye main video in coded form, to generate the right-eye main video. The generated right-eye main video is stored, for example, in a memory such as a DRAM. The right-eye main video processing unit 132 may change an image size, a frame rate, and a scanning mode of the generated right-eye main video.

The selection unit 133 alternately selects the left-eye main video and the right-eye main video per picture, and outputs the selected image to the synthesis unit 150. A 3D display technique employed here is a technique of alternately displaying the left-eye main video and the right-eye main video per picture. As an alternative, a technique of displaying the left-eye main video and the right-eye main video within one picture in units of spatially different pixels may be employed. In this case, the main video processing unit 130 includes a video synthesis unit that arranges the left-eye main video and the right-eye main video per pixel, instead of the selection unit 133.

The object processing unit 140 decodes the left-eye stream and the right-eye stream to generate the left-eye object image and the right-eye object image, respectively. A structure and an operation of the object processing unit 140 will be described in detail later.

The synthesis unit 150 superimposes, per picture, an object image outputted from the object processing unit 140 on main video outputted from the main video processing unit 130, to generate a synthetic image. The generated synthetic image is outputted to a display apparatus such as a display panel and displayed.

Figure 2:
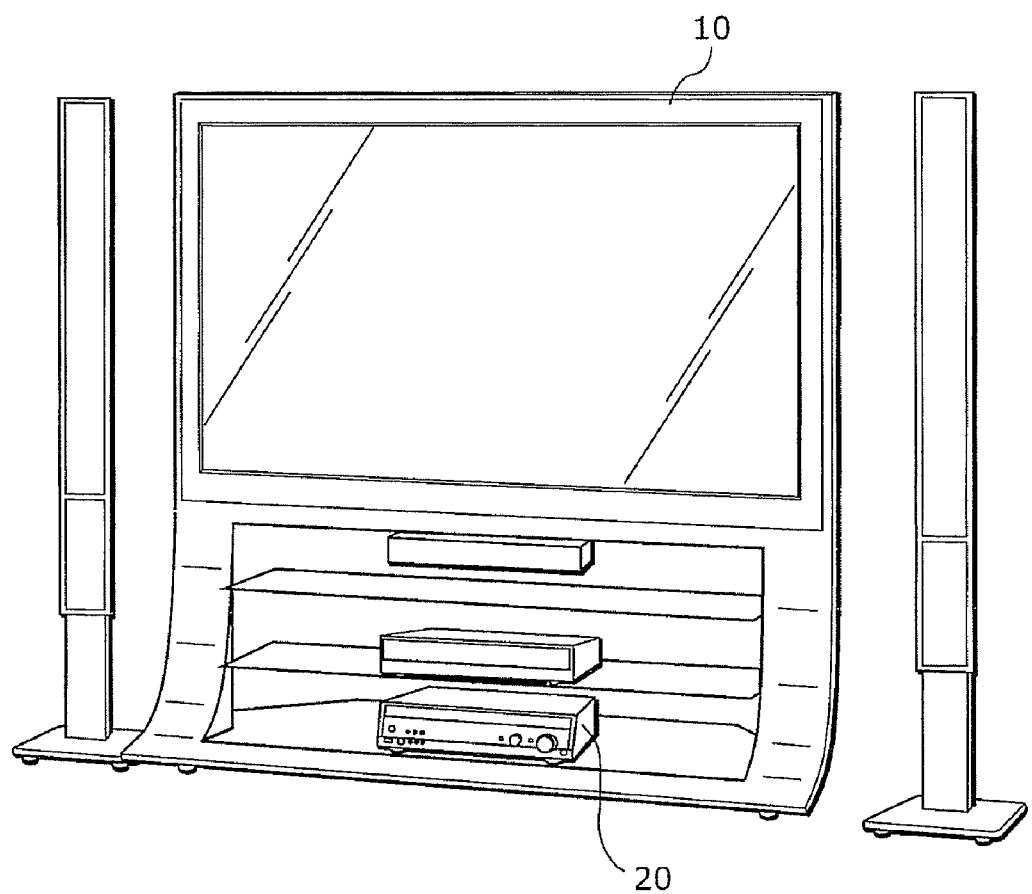
FIG. 2 is a schematic diagram showing an appearance of a digital video recorder and a digital television including the 3D video processor.

For instance, the 3D video processor 100 according to the first embodiment is included in a digital television 10 or a digital video recorder 20 shown in FIG. 2. In the case where the 3D video processor 100 is included in the digital video recorder 20, for example, the synthetic image generated by the synthesis unit 150 is outputted to the digital television 10 via a HDMI cable or the like.

The following describes a detailed structure of the object processing unit 140 according to the first embodiment.

Figure 3:
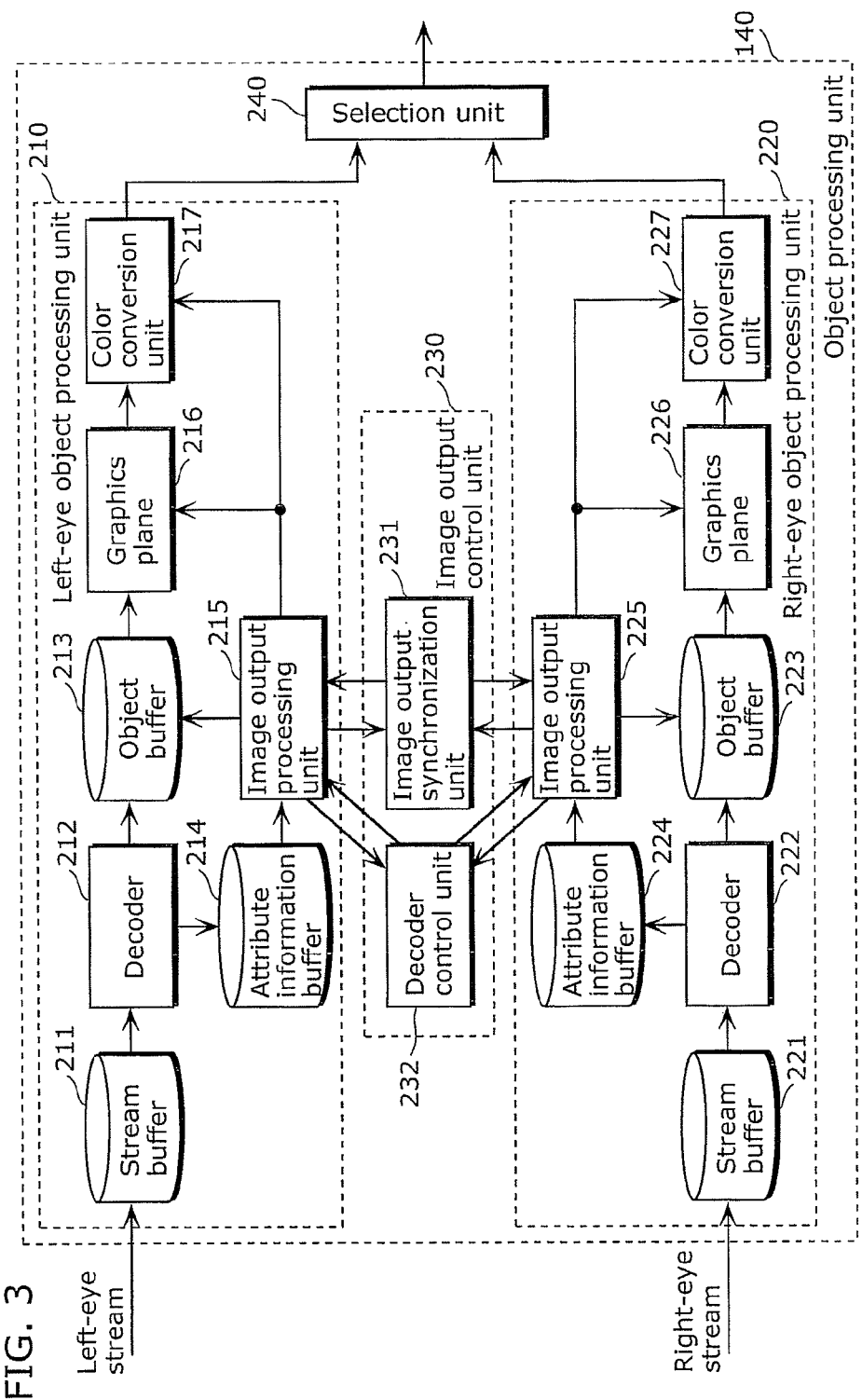
FIG. 3 is a block diagram showing a structure of an object processing unit according to the first embodiment.

FIG. 3 is a block diagram showing a structure of the object processing unit 140 according to the first embodiment. The object processing unit 140 generates and outputs the left-eye object image and the right-eye object image which have parallax and are to be superimposed on the main video. The left-eye object image and the right-eye object image are each a subtitle, a symbol, a figure, or a menu image.

As shown in FIG. 3, the object processing unit 140 includes a left-eye object processing unit 210, a right-eye object processing unit 220, an image output control unit 230, and a selection unit 240.

The left-eye object processing unit 210 is an example of a first image processing unit that performs image output preparation of a first image and outputs the first image, where the first image is one of the left-eye object image and the right-eye object image. The left-eye object processing unit 210 decodes the left-eye stream including the left-eye object image in coded form, to generate the left-eye object image. The left-eye object processing unit 210 includes a first plane memory, performs the image output preparation by rendering the generated left-eye object image on the first plane memory using a header, and outputs the left-eye object image at a predetermined image output scheduled time.

As shown in FIG. 3, the left-eye object processing unit 210 includes a stream buffer 211, a decoder 212, an object buffer 213, an attribute information buffer 214, an image output processing unit 215, a graphics plane 216, and a color conversion unit 217.

The stream buffer 211 is a buffer memory for storing the left-eye stream received from the separation unit 120.

The decoder 212 reads the left-eye stream from the stream buffer 211, and decodes the read left-eye stream to generate the left-eye object image and the header. The left-eye object image is stored in the object buffer 213, whilst the header is stored in the attribute information buffer 214.

Note that the header includes attribute information of the left-eye object image, such as information used for controlling the rendering and the image output of the left-eye object image. For instance, the header includes video information indicating an image size and a frame rate of the main video, window information indicating an identifier and a window size of a window, object control information indicating an identifier and a clipping size of the object image, and the like. The header also includes information indicating a display position of the object image, and the like.

Note that, among the above information included in the header, the video information, the window information, and the object control information are the same between the left-eye object image and the right-eye object image.

The object buffer 213 is a buffer memory for holding the left-eye object image. As an example, the left-eye object image is a bitmapped image.

The attribute information buffer 214 is a buffer memory for holding the header mentioned above.

The image output processing unit 215 performs the image output preparation of the left-eye object image, using the header stored in the attribute information buffer 214. In detail, the image output processing unit 215 performs the image output preparation by rendering, on the graphics plane 216, the left-eye object image stored in the object buffer 213, according to the attribute information included in the header. Upon completing the image output preparation, the image output processing unit 215 issues a preparation completion notification indicating the completion of the image output preparation, to the image output control unit 230. The preparation completion notification includes an image output scheduled time, such as a PTS (Presentation Time Stamp), of the left-eye object image for which the image output preparation is completed.

The image output processing unit 215 then controls, according to an image output instruction from the image output control unit 230, the graphics plane 216 and the color conversion unit 217 so that the left-eye object image is outputted at the image output scheduled time at which the left-eye object image is to be outputted. Moreover, the image output processing unit 215 is an example of a first determination unit, and determines whether or not the image output preparation of the left-eye object image is completed.

In detail, the image output processing unit 215 analyzes the header stored in the attribute information buffer 214. When determining, as a result of analysis, that an error occurs in the header, the image output processing unit 215 determines that the image output preparation of the left-eye object image is not completed, and issues an error notification indicating the error occurrence, to the image output control unit 230. The error notification includes the image output scheduled time, such as the PTS, of the left-eye object image.

Examples of a situation where an error occurs in the header include: a situation where the header does not conform to a predetermined specification, that is, the header is nonconforming; and a situation where the header is missing and so the header of the left-eye object image is not stored in the attribute information buffer 214.

When receiving an image output skip instruction from the image output control unit 230, the image output processing unit 215 skips the image output of the left-eye object image corresponding to a time indicated by the image output skip instruction. In detail, the image output processing unit 215 skips the image output of the left-eye object image, by suppressing image output processing on the graphics plane 216. In this case, data written on the graphics plane 216 is cleared for the image output preparation of the next object image.

The graphics plane 216 is an example of the first plane memory, and is a rendering plane memory used for rendering the left-eye object image.

The color conversion unit 217 has a CLUT (Color Look Up Table), and displays the left-eye object image in color.

Note that, in the case where the left-eye object image in uncoded form is inputted to the left-eye object processing unit 210, the stream buffer 211 and the decoder 212 may be omitted from the left-eye object processing unit 210.

The right-eye object processing unit 220 is an example of a second image processing unit that performs image output preparation of a second image and outputs the second image, where the second image is the other one of the left-eye object image and the right-eye object image. The right-eye object processing unit 220 decodes the right-eye stream including the right-eye object image in coded form, to generate the right-eye object image. The right-eye object processing unit 220 includes a second plane memory, performs the image output preparation by rendering the generated right-eye object image on the second plane memory using a header, and outputs the right-eye object image at a predetermined image output scheduled time.

As shown in FIG. 3, the right-eye object processing unit 220 includes a stream buffer 221, a decoder 222, an object buffer 223, an attribute information buffer 224, an image output processing unit 225, a graphics plane 226, and a color conversion unit 227.

The stream buffer 221 is a buffer memory for storing the right-eye stream received from the separation unit 120.

The decoder 222 reads the right-eye stream from the stream buffer 221, and decodes the read right-eye stream to generate the right-eye object image and the header. The right-eye object image is stored in the object buffer 223, whilst the header is stored in the attribute information buffer 224.

Note that the header includes attribute information of the right-eye object image, such as information used for controlling the rendering and the image output of the right-eye object image. For instance, the header includes video information indicating an image size and a frame rate of the main video, window information indicating an identifier and a window size of a window, object control information indicating an identifier and a clipping size of the object image, and the like. The header also includes information indicating a display position of the object image, and information indicating the parallax between the left-eye object image and the right-eye object image.

Note that, among the above information included in the header, the video information, the window information, and the object control information are the same between the left-eye object image and the right-eye object image.

The object buffer 223 is a buffer memory for holding the right-eye object image. As an example, the right-eye object image is a bitmapped image.

The attribute information buffer 224 is a buffer memory for holding the header mentioned above.

The image output processing unit 225 performs the image output preparation of the right-eye object image, using the header stored in the attribute information buffer 224. In detail, the image output processing unit 225 performs the image output preparation by rendering, on the graphics plane 226, the right-eye object image stored in the object buffer 223, according to the attribute information included in the header. Upon completing the image output preparation, the image output processing unit 225 issues the preparation completion notification indicating the completion of the image output preparation, to the image output control unit 230. The preparation completion notification includes an image output scheduled time, such as a PTS, of the right-eye object image for which the image output preparation is completed.

The image output processing unit 225 then controls, according to the image output instruction from the image output control unit 230, the graphics plane 226 and the color conversion unit 227 so that the right-eye object image is outputted at the image output scheduled time at which the right-eye object image is to be outputted. Moreover, the image output processing unit 225 is an example of a second determination unit, and determines whether or not the image output preparation of the right-eye object image is completed.

In detail, the image output processing unit 225 analyzes the header stored in the attribute information buffer 224. When determining, as a result of analysis, that an error occurs in the header, the image output processing unit 225 determines that the image output preparation of the right-eye object image is not completed, and issues the error notification indicating the error occurrence, to the image output control unit 230. The error notification includes the image output scheduled time, such as the PTS, of the right-eye object image.

Examples of a situation where an error occurs in the header include: a situation where the header does not conform to the predetermined specification, that is, the header is nonconforming; and a situation where the header is missing and so the header of the right-eye object image is not stored in the attribute information buffer 224.

When receiving the image output skip instruction from the image output control unit 230, the image output processing unit 225 skips the image output of the right-eye object image corresponding to a time indicated by the image output skip instruction. In detail, the image output processing unit 225 skips the image output of the right-eye object image, by suppressing the image output processing on the graphics plane 226. In this case, data written on the graphics plane 226 is cleared for the image output preparation of the next object image.

The graphics plane 226 is an example of the second plane memory, and is a rendering plane memory used for rendering the right-eye object image.

The color conversion unit 227 has a GLUT (Color Look Up Table), and displays the right-eye object image in color.

Note that, in the case where the right-eye object image in uncoded form is inputted to the right-eye object processing unit 220, the stream buffer 221 and the decoder 222 may be omitted from the right-eye object processing unit 220.

The image output control unit 230 controls the left-eye object processing unit 210 and the right-eye object processing unit 220 so that the left-eye object image and the right-eye object image are synchronously outputted. As shown in FIG. 3, the image output control unit 230 includes an image output synchronization unit 231 and a decoder control unit 232.

The image output synchronization unit 231 synchronizes the left-eye object image and the right-eye object image. In detail, based on the PTS notified from each of the image output processing units 215 and 225, the image output synchronization unit 231 issues the image output instruction to each of the image output processing units 215 and 225 so that the left-eye object image and the right-eye object image having the same PTS are outputted at the same time indicated by the PTS.

The decoder control unit 232 instructs to skip the image output of both the left-eye object image and the right-eye object image, when one of the image output processing units 215 and 225 determines that the image output preparation of a corresponding one of the left-eye object image and the right-eye object image is not completed. In detail, when receiving the error notification from one of the image output processing units 215 and 225, the decoder control unit 232 issues the image output skip instruction to both the image output processing units 215 and 225.

The image output skip instruction is an instruction to skip image output, and includes a PTS of an image to be skipped. That is, the decoder control unit 232 notifies the PTS received together with the error notification from one of the image output processing units 215 and 225, to both the image output processing units 215 and 225 as the image output skip instruction.

The selection unit 240 alternately selects, per picture, the left-eye object image outputted from the left-eye object processing unit 210 and the right-eye object image outputted from the right-eye object processing unit 220, and outputs the selected image to the synthesis unit 150.

Here, as a 3D display technique, the selection unit 240 employs a technique of alternately displaying the left-eye object image and the right-eye object image per picture, as in the selection unit 133. Alternatively, a technique of displaying the left-eye object image and the right-eye object image within one picture in units of spatially different pixels may be employed. In this case, the object processing unit 140 includes an object image synthesis unit that arranges the left-eye object image and the right-eye object image per pixel, instead of the selection unit 240.

According to the above structure, the 3D video processor 100 according to the first embodiment includes the main video processing unit 130 that performs decoding and the like of the main video, and the object processing unit 140 that performs decoding and the like of the object image which is an image superimposed on the main video. In the object processing unit 140, the left-eye object processing unit 210 decodes the left-eye stream to generate and output the left-eye object image, and the right-eye object processing unit 220 decodes the right-eye stream to generate and output the right-eye object image.

Moreover, the image output control unit 230 instructs to synchronously output the left-eye object image and the right-eye object image. Furthermore, when the image output preparation of one of the left-eye object image and the right-eye object image is not completed, that is, when an error occurs in one of the header of the left-eye object image and the header of the right-eye object image, the image output control unit 230 instructs to skip the image output of both the left-eye object image and the right-eye object image.

The 3D video processor 100 according to the first embodiment maintains 3D display by such skipping the image output. This alleviates the viewer's discomfort that the object image is displayed in 2D due to error occurrence in the header.

The following describes an error detection-related operation of the object processing unit 140 according to the first embodiment. A situation where an error occurs in the header of the left-eye object image is described below, for simplicity's sake. Since the same applies to a situation where an error occurs in the header of the right-eye object image, its description is omitted. As an example of the situation where an error occurs in the header, a situation where the header is nonconforming is described below.

Figure 4:
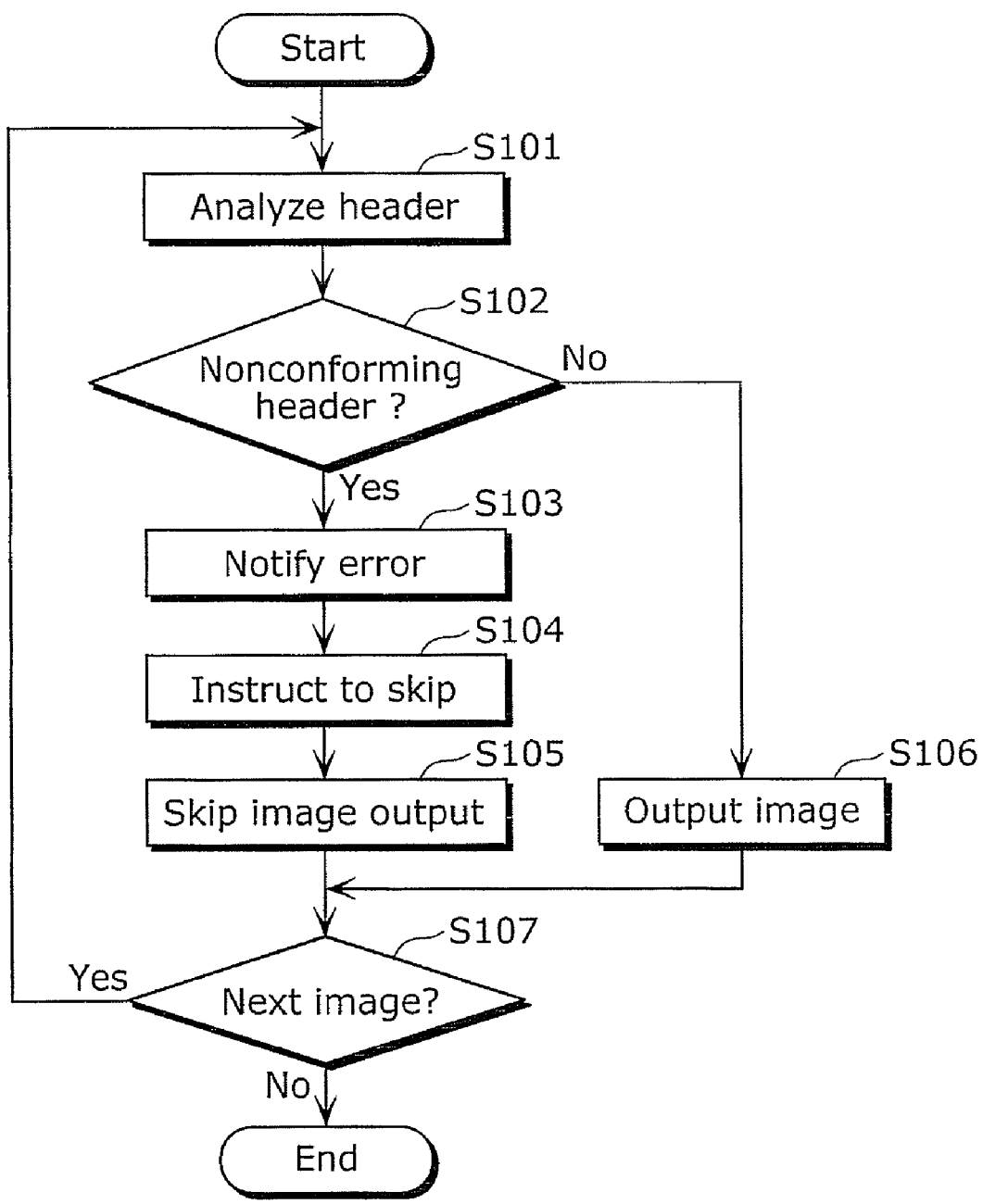
FIG. 4 is a flowchart showing an error detection-related operation of the object processing unit according to the first embodiment.

FIG. 4 is a flowchart showing the error detection-related operation of the object processing unit 140 according to the first embodiment.

First, the image output processing unit 215 analyzes the header stored in the attribute information buffer 214 (Step S101). When determining the header as nonconforming as a result of analysis (Step S102: Yes), the image output processing unit 215 issues the error notification including the image output scheduled time (PTS) of the left-eye object image corresponding to the header determined as nonconforming, to the decoder control unit 232 (Step S103). Upon receiving the error notification, the decoder control unit 232 issues the image output skip instruction including the image output scheduled time indicated by the error notification, to both the image output processing units 215 and 225 (Step S104).

Having received the image output skip instruction, the image output processing units 215 and 225 respectively skip the image output of the left-eye object image and the right-eye object image corresponding to the image output scheduled time (Step S105). The image output processing units 215 and 225 also respectively clear data on the graphics planes 216 and 226.

When determining the header as conforming to the specification as a result of analysis (Step S102: No), on the other hand, the image output processing unit 215 outputs the left-eye object image according to the image output instruction from the image output synchronization unit 231 (Step S106). The image output processing unit 225 equally outputs the right-eye object image according to the image output instruction from the image output synchronization unit 231.

The above processing (Steps S101 to S106) is repeated until there is no image to be outputted next (Step S107).

Thus, the object processing unit 140 according to the first embodiment detects that the image output preparation of one of the left-eye object image and the right-eye object image is not completed, by analyzing the header. In more detail, the object processing unit 140 determines whether or not one of the header of the left-eye object image and the header of the right-eye object image conforms to the specification.

When the header is nonconforming as a result of analysis (determination), the object processing unit 140 skips the image output of both the left-eye object image and the right-eye object image of the image output scheduled time corresponding to the nonconforming header. That is, the object processing unit 140 suppresses the image output of both the left-eye object image and the right-eye object image, and executes the processing of the next object image.

Though the operation of the left-eye object processing unit 210 when an error occurs in the left-eye object image is mainly described with reference to FIG. 4, the right-eye object processing unit 220 operates in the same way as the left-eye object processing unit 210.

As mentioned earlier, the left-eye stream and the right-eye stream can be decoded independently of each other, and so there is no need to synchronize the left-eye object processing unit 210 and the right-eye object processing unit 220 except for the image output timing. This allows the image output control unit 230 to issue, upon receiving the error notification from one of the left-eye object processing unit 210 and the right-eye object processing unit 220, the image output skip instruction to the other one of the left-eye object processing unit 210 and the right-eye object processing unit 220.

Figure 5A:
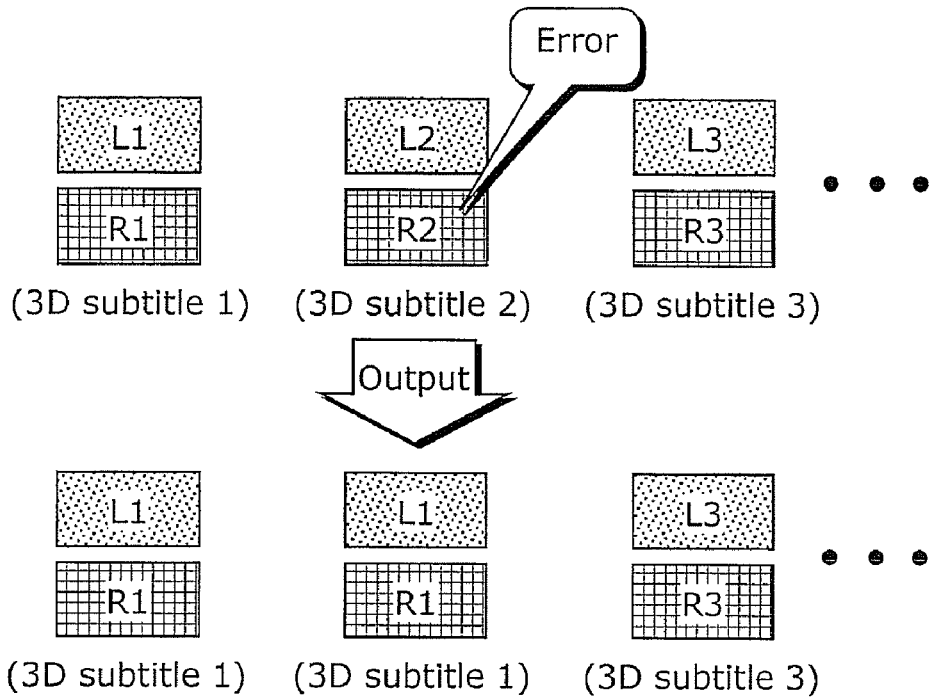
FIG. 5A is a schematic diagram showing images outputted when an error occurs, according to the first embodiment.

FIG. 5A is a schematic diagram showing images outputted when an error occurs, according to the first embodiment.

As shown in FIG. 5A, each 3D object image is composed of a left-eye object image (L1, L2, L3, . . . ) and a right-eye object image (R1, R2, R3, . . . ). By providing parallax between the left-eye object image and the right-eye object image, the viewer can stereoscopically perceive the displayed image.

For example, a typical method of displaying a left-eye image and a right-eye image in 3D is a method whereby the left-eye image and the right-eye image are alternately displayed per picture. In this case, the viewer wears shutter glasses having a left-eye liquid crystal shutter and a right-eye liquid crystal shutter, which are opened and closed synchronously with the display.

In more detail, the display apparatus exercises control so that only the left-eye liquid crystal shutter is opened while the left-eye image is being displayed and only the right-eye liquid crystal shutter is opened while the right-eye image is being displayed. This enables the viewer to selectively view the left-eye image with his/her left eye and the right-eye image with his/her right eye and thus stereoscopically perceive the displayed image.

As an alternative, the display apparatus may arrange, per pixel, the left-eye image and the right-eye image within one picture in a checkered pattern, and display the left-eye image and the right-eye image with different polarized light. In this case, the viewer wears polarized glasses having a left-eye polarizing filter and a right-eye polarizing filter. This enables the viewer to selectively view the left-eye image with his/her left eye and the right-eye image with his/her right eye and thus stereoscopically perceive the displayed image.

A situation where a header of the right-eye object image R2 is nonconforming and the image output processing unit 225 issues the error notification to the decoder control unit 232 is described below, as shown in FIG. 5A. The decoder control unit 232 issues the image output skip instruction to both the image output processing units 215 and 225, so that not only the image output of the right-eye object image R2 but also the image output of the left-eye object image L2 is suppressed.

Hence, in a period during which the left-eye object image L2 and the right-eye object image R2 are supposed to be displayed, the left-eye object image Li and the right-eye object image R1 remain displayed in 3D.

Conventionally, the image (the left-eye object image L2 in this example) paired with the image having an error is displayed in 2D, which causes discomfort to the viewer. On the other hand, the 3D video processor 100 according to the first embodiment maintains 3D display, with it being possible to alleviate the viewer's discomfort.

Figure 5B:
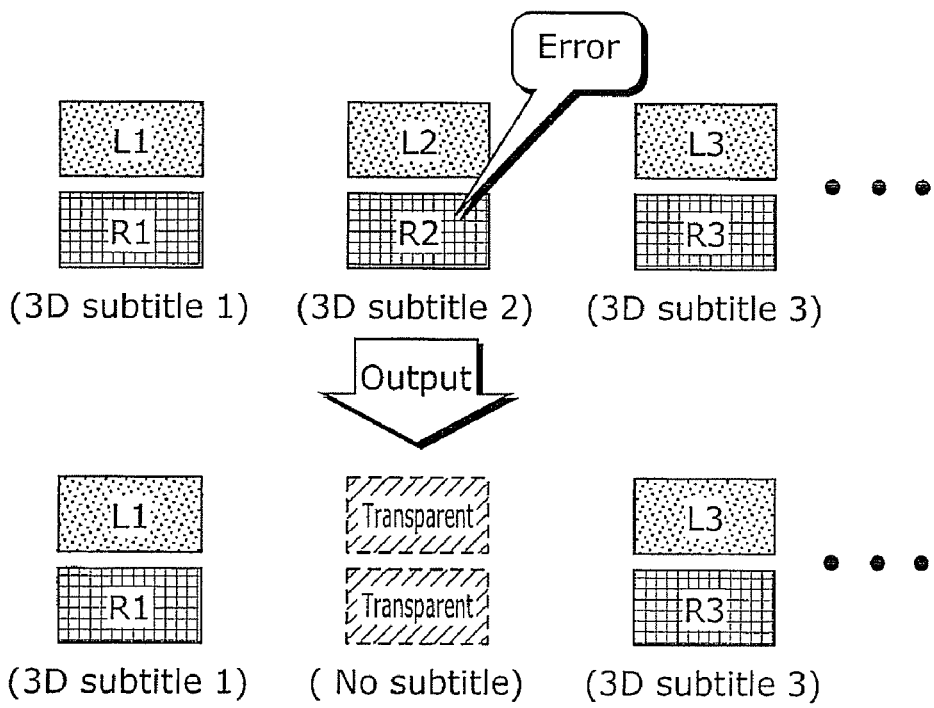
FIG. 5B is a schematic diagram showing images outputted when an error occurs, according to the first embodiment.

Here, instead of merely skipping the image output of the left-eye object image L2 and the right-eye object image R2, erasure data for erasing the preceding image that remains displayed may be outputted as shown in FIG. 5B.

In detail, the image output processing units 215 and 225 respectively write erasure data on the graphics planes 216 and 226. The erasure data is data for erasing the left-eye object image or the right-eye object image that remains rendered on the graphics plane 216 or 226. Specifically, the erasure data is a transparent image through which the superimposition target image (such as the left-eye main video and the right-eye main video) can be seen. As a result, no object image is displayed in the period during which the left-eye object image L2 and the right-eye object image R2 are supposed to be displayed (only the main video is displayed in 3D).

In this way, not only the 2D display of the image at error occurrence can be prevented, but also the continuous display of the immediately preceding image can be prevented. For instance, in the case where the main video is a movie and the object image is a subtitle, it is possible to prevent such a situation where, in a period during which main video corresponding to one dialog is being displayed, a subtitle of an immediately preceding dialog is displayed. This further alleviates the viewer's discomfort.

Thus, the preceding image that remains displayed can be erased by outputting the erasure data. This allows, for example, the immediately preceding subtitle to be erased, thereby preventing an inconsistency between the main video and the subtitle.

As described above, in the 3D video processor 100 according to the first embodiment, when the image output preparation of one of the left-eye object image and the right-eye object image is not completed, in detail, when an error occurs in one of the header of the left-eye object image and the header of the right-eye object image and so the image cannot be properly displayed, the image output control unit 230 instructs to skip the image output of both the left-eye object image and the right-eye object image.

By skipping the image output of the image at error occurrence in such a way, the 3D video processor 100 according to the first embodiment maintains 3D display. This alleviates the viewer's discomfort that the object image is displayed in 2D due to error occurrence in the header.

In detail, the 3D video processor 100 according to the first embodiment determines whether or not the header conforms to the specification. When determining the header as not conforming to the specification, the 3D video processor 100 according to the first embodiment skips the image output of both the left-eye object image and the right-eye object image. As a result, 3D object image display is maintained. This alleviates the viewer's discomfort that the object image is displayed in 2D when the header does not conform to the specification.

(Second Embodiment)

A 3D video processor according to a second embodiment of the present invention is a 3D video processor that outputs a left-eye object image and a right-eye object image which have parallax and are to be superimposed on main video, the 3D video processor including: a first image processing unit that performs image output preparation of a first image and outputs the first image, the first image being one of the left-eye object image and the right-eye object image; a second image processing unit that performs image output preparation of a second image and outputs the second image, the second image being an other one of the left-eye object image and the right-eye object image; and an image output control unit that controls the first image processing unit and the second image processing unit so that the first image and the second image are synchronously outputted, wherein the first image processing unit includes a first determination unit that determines whether or not the image output preparation of the first image is completed, the second image processing unit includes a second determination unit that determines whether or not the image output preparation of the second image is completed, and the image output control unit instructs the first image processing unit to output a predetermined complementary image as the first image, when the first determination unit determines that the image output preparation of the first image is not completed and the second determination unit determines that the image output preparation of the second image is completed.

According to this structure, when the image output preparation of the first image is not completed, the complementary image is outputted. Hence, 3D display can be maintained using the complementary image and the second image. This alleviates the viewer's discomfort that the object image is displayed in 2D.

In detail, the 3D video processor according to the second embodiment determines whether or not an error occurs in the header. When determining that an error occurs in the header, the 3D video processor according to the second embodiment determines that the image output preparation of the image corresponding to the header is not completed, and generates the complementary image using the attribute information of the header of the other image paired with the image corresponding to the header having the error.

That is, the 3D video processor according to the second embodiment differs from the 3D video processor according to the first embodiment in that, when determining that an error occurs in the header, the complementary image is generated and the generated complementary image is outputted in place of the image corresponding to the header having the error, instead of skipping the image output of both the left-eye object image and the right-eye object image.

The following mainly describes the differences from the first embodiment, while omitting the same parts as the first embodiment. In detail, since the coded stream separation and the main video processing are the same as in the first embodiment, their description is omitted, and the object image processing is mainly described below.

Figure 6:
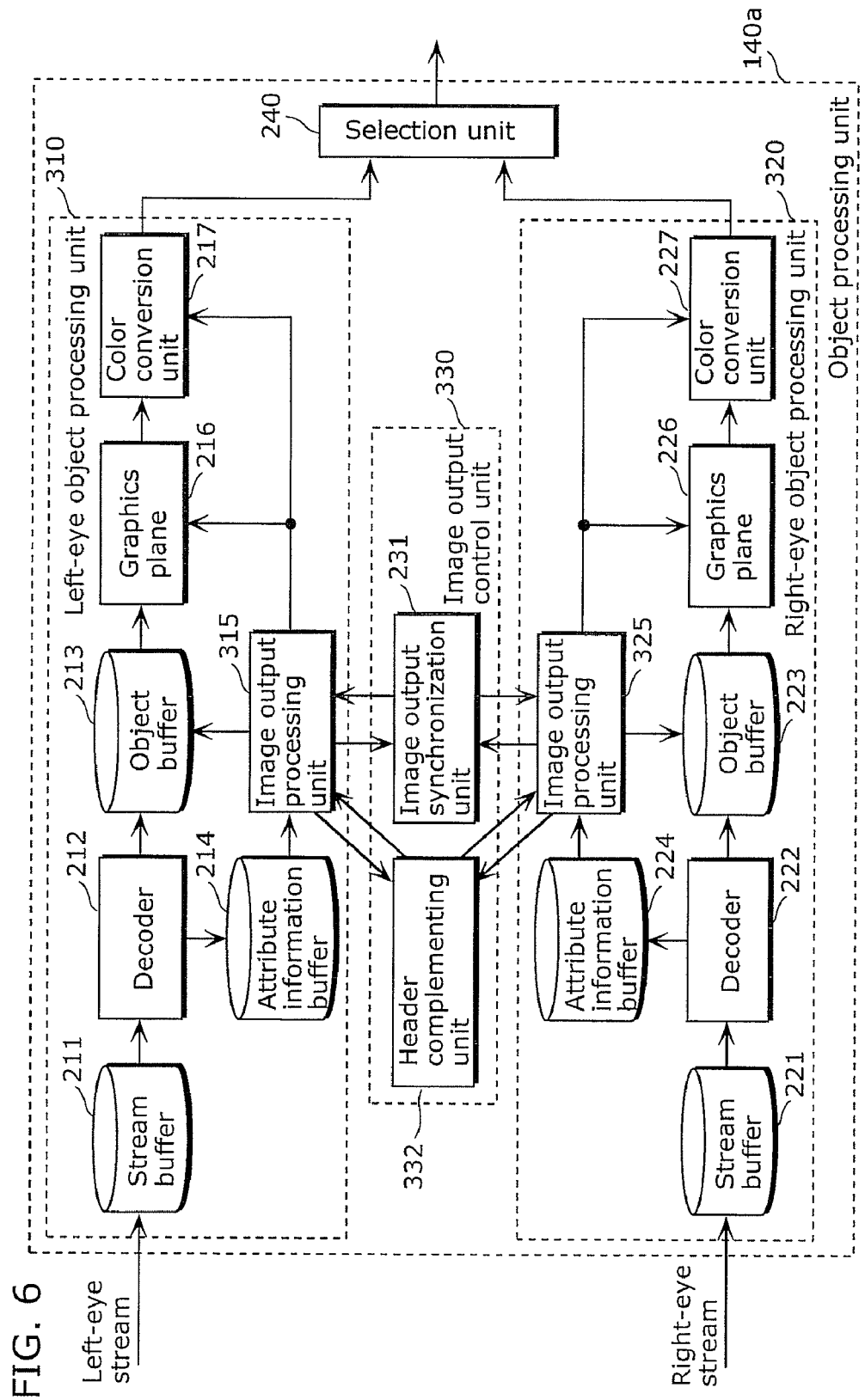
FIG. 6 is a block diagram showing a structure of an object processing unit according to a second embodiment of the present invention.

FIG. 6 is a block diagram showing a structure of an object processing unit 140*a* according to the second embodiment. Note that the object processing unit 140*a* corresponds to the object processing unit 140 shown in FIG. 1.

The object processing unit 140*a* shown in FIG. 6 differs from the object processing unit 140 shown in FIG. 3 in that a left-eye object processing unit 310, a right-eye object processing unit 320, and an image output control unit 330 are included instead of the left-eye object processing unit 210, the right-eye object processing unit 220, and the image output control unit 230.

In detail, the left-eye object processing unit 310 differs from the left-eye object processing unit 210 shown in FIG. 3 in that an image output processing unit 315 is included instead of the image output processing unit 215. The right-eye object processing unit 320 differs from the right-eye object processing unit 220 shown in FIG. 3 in that an image output processing unit 325 is included instead of the image output processing unit 225. The image output control unit 330 differs from the image output control unit 230 shown in FIG. 3 in that a header complementing unit 332 is included instead of the decoder control unit 232.

The image output processing unit 315 operates in the same way as the image output processing unit 215. In addition, when issuing the error notification to the image output control unit 330, the image output processing unit 315 notifies the header complementing unit 332 of an identifier for identifying attribute information included in a header having an error. In detail, the image output processing unit 315 determines, for each set of attribute information, whether or not the attribute information is nonconforming, and notifies an identifier for identifying the attribute information determined as nonconforming.

Here, the image output processing unit 315 notifies an identifier for identifying attribute information that is interchangeable with attribute information included in the header of the right-eye object image, i.e., the same attribute information as the attribute information included in the header of the right-eye object image. Examples of such attribute information include the video information, the window information, and the object control information mentioned earlier.

Moreover, when receiving a header obtainment request from the header complementing unit 332, the image output processing unit 315 passes attribute information of a header indicated by the header obtainment request, to the header complementing unit 332. The header obtainment request includes an identifier of attribute information included in a header having an error.

Furthermore, when receiving a header from the header complementing unit 332 after the issuance of the error notification, the image output processing unit 315 generates a complementary image using attribute information of the received header, and outputs the generated complementary image at the image output scheduled time of the left-eye object image corresponding to the header having the error. Here, the image output processing unit 315 analyzes the header received from the header complementing unit 332. The image output processing unit 315 reads the left-eye object image from the object buffer 213, and renders the read left-eye object image on the graphics plane 216 using the attribute information of the header, to generate the complementary image.

The image output processing unit 325 operates in the same way as the image output processing unit 225. In addition, when issuing the error notification to the image output control unit 330, the image output processing unit 325 notifies the header complementing unit 332 of an identifier for identifying attribute information included in a header having an error. In detail, the image output processing unit 325 determines, for each set of attribute information, whether or not the attribute information is nonconforming, and notifies an identifier for identifying the attribute information determined as nonconforming.

Here, the image output processing unit 325 notifies an identifier for identifying attribute information that is interchangeable with attribute information included in the header of the left-eye object image, i.e., the same attribute information as the attribute information included in the header of the left-eye object image. Examples of such attribute information include the video information, the window information, and the object control information mentioned earlier.

Moreover, when receiving the header obtainment request from the header complementing unit 332, the image output processing unit 325 passes attribute information of a header indicated by the header obtainment request, to the header complementing unit 332. The header obtainment request includes an identifier of attribute information included in a header having an error.

Furthermore, when receiving a header from the header complementing unit 332 after the issuance of the error notification, the image output processing unit 325 generates a complementary image using attribute information of the received header, and outputs the generated complementary image at the image output scheduled time of the right-eye object image corresponding to the header having the error. Here, the image output processing unit 325 analyzes the header received from the header complementing unit 332. The image output processing unit 325 reads the right-eye object image from the object buffer 223, and renders the read right-eye object image on the graphics plane 226 using the attribute information of the header, to generate the complementary image.

The header complementing unit 332 obtains, when one of the header of the left-eye object image and the header of the right-eye object image does not conform to the specification, the other header that includes the same attribute information as the attribute information included in the nonconforming header. In detail, when receiving the error notification from one of the image output processing units 315 and 325, the header complementing unit 332 issues the header obtainment request including the identifier of the attribute information included in the received error notification, to the other one of the image output processing units 315 and 325. The header complementing unit 332 then obtains the attribute information from the other one of the image output processing units 315 and 325 receiving the header obtainment request, and passes the obtained attribute information to the one of the image output processing units 315 and 325.

According to the above structure, the object processing unit 140a according to the second embodiment includes the header complementing unit 332. When one of the left-eye object processing unit 310 and the right-eye object processing unit 320 determines that an error occurs in the header, the header complementing unit 332 obtains the attribute information of the header from the other one of the left-eye object processing unit 310 and the right-eye object processing unit 320, and passes the obtained attribute information of the header to the one of the left-eye object processing unit 310 and the right-eye object processing unit 320 detecting the error. Having newly obtained the attribute information of the header, the one of the left-eye object processing unit 310 and the right-eye object processing unit 320 generates the complementary image using the obtained attribute information, and outputs the generated complementary image.

Thus, the object processing unit 140a according to the second embodiment outputs the complementary image, instead of the image having an error. This alleviates the viewer's discomfort that the object image is displayed in 2D due to the nonconforming header. Besides, information that would have been obtained if there is no error can be complemented. This alleviates the viewer's discomfort that information which is supposed to be provided is missing.

The following describes an error detection-related operation of the object processing unit 140a according to the second embodiment. A situation where an error occurs in the header of the left-eye object image is described below, for simplicity's sake. Since the same applies to a situation where an error occurs in the header of the right-eye object image, its description is omitted. As an example of the situation where an error occurs in the header, a situation where the header is nonconforming is described below.

Figure 7:
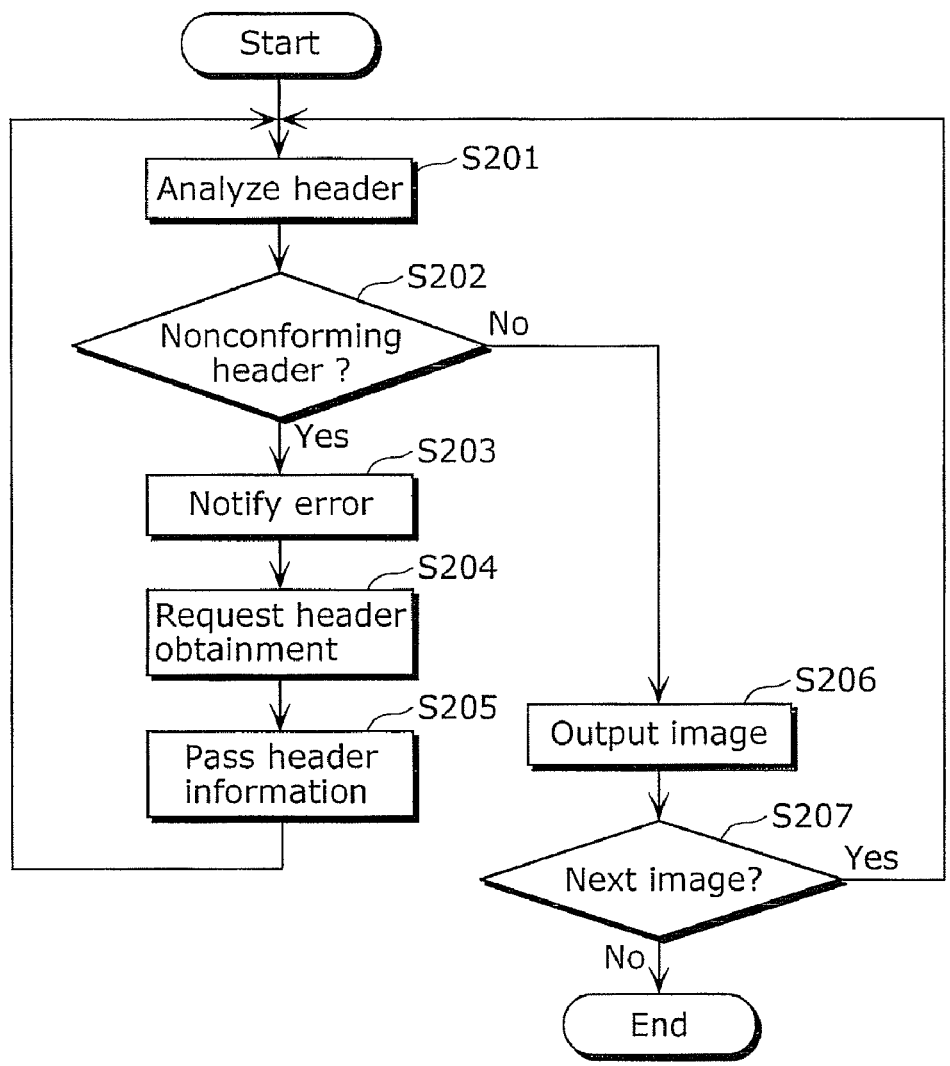
FIG. 7 is a flowchart showing an error detection-related operation of the object processing unit according to the second embodiment.

FIG. 7 is a flowchart showing the error detection-related operation of the object processing unit 140a according to the second embodiment.

First, the image output processing unit 315 analyzes the header stored in the attribute information buffer 214 (Step S201). When determining the header as nonconforming as a result of analysis (Step S202: Yes), the image output processing unit 315 issues the error notification including the image output scheduled time (PTS) of the left-eye object image corresponding to the header determined as nonconforming and the identifier of the attribute information having an error, to the header complementing unit 332 (Step S203).

Upon receiving the error notification, the header complementing unit 332 issues the header obtainment request to the image output processing unit 325 (Step S204). The image output processing unit 325 passes the attribute information corresponding to the identifier indicated by the header obtainment request, to the header complementing unit 332. The header complementing unit 332 passes the attribute information received from the image output processing unit 325, to the image output processing unit 315 (Step S205). The image output processing unit 315 analyzes the received attribute information again (Step S201).

When determining the header as conforming as a result of analysis (Step S202: No), the image output processing unit 315 outputs the left-eye object image according to the image output instruction from the image output synchronization unit 231 (Step S206). The image output processing unit 325 equally outputs the right-eye object image according to the image output instruction from the image output synchronization unit 231.

Here, in the case where the attribute information is received from the header complementing unit 332, the image output processing unit 315 generates the complementary image according to the received attribute information, and outputs the generated complementary image as the left-eye object image.

The above processing (Steps S201 to S206) is repeated until there is no image to be outputted next (Step S207).

When the image output processing unit 315 analyzes the attribute information received from the header complementing unit 332 and again determines that the header is nonconforming, for example the image output of both the left-eye object image and the right-eye object image may be skipped as in the first embodiment.

Thus, the object processing unit 140a according to the second embodiment detects that the image output preparation of one of the left-eye object image and the right-eye object image is not completed, by analyzing the header. In more detail, the object processing unit 140*a* determines whether or not one of the header of the left-eye object image and the header of the right-eye object image conforms to the specification.

When the header is nonconforming as a result of analysis (determination), instead of the one of the left-eye object image and the right-eye object image of the image output scheduled time corresponding to the nonconforming header, the object processing unit 140*a* outputs the complementary image generated using the attribute information of the header of the other one of the left-eye object image and the right-eye object image.

Though the operation of the left-eye object processing unit 310 when an error occurs in the left-eye object image is mainly described with reference to FIG. 7, the right-eye object processing unit 320 operates in the same way as the left-eye object processing unit 310.

As mentioned earlier, the left-eye stream and the right-eye stream can be decoded independently of each other, and so there is no need to synchronize the left-eye object processing unit 310 and the right-eye object processing unit 320 except for the image output timing. This allows the image output control unit 330 to issue, upon receiving the error notification from one of the left-eye object processing unit 310 and the right-eye object processing unit 320, the header obtainment request to the other one of the left-eye object processing unit 310 and the right-eye object processing unit 320. In the case where the corresponding header is not yet stored in the attribute information buffer 214 or 224 at the time when the other one of the left-eye object processing unit 310 and the right-eye object processing unit 320 receives the header obtainment request, the other one of the left-eye object processing unit 310 and the right-eye object processing unit 320 waits until the header is generated by the decoder 212 or 222 and then passes the generated header to the header complementing unit 332.

Figure 8:
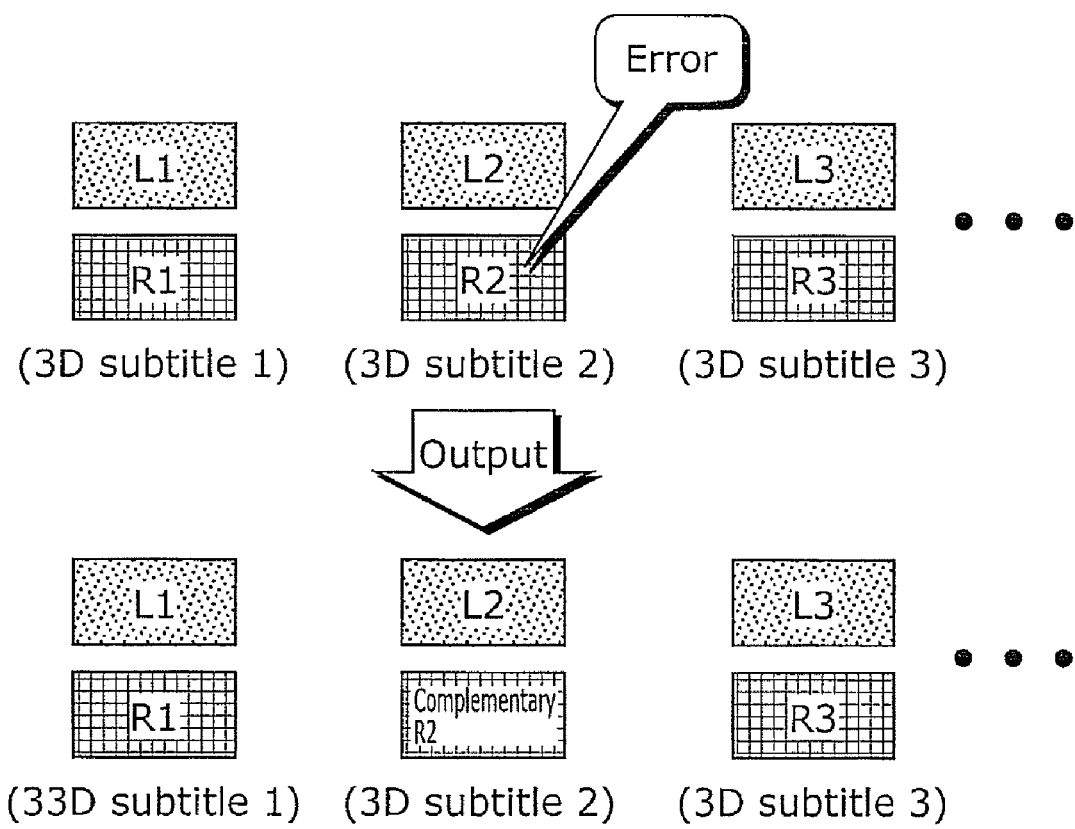
FIG. 8 is a schematic diagram showing images outputted when an error occurs, according to the second embodiment.

FIG. 8 is a schematic diagram showing images outputted when an error occurs, according to the second embodiment.

A situation where the header of the right-eye object image R2 is nonconforming and the image output processing unit 325 issues the error notification to the header complementing unit 332 is described below, as shown in FIG. 8. The header complementing unit 332 issues the header obtainment request to the image output processing unit 315, and obtains the attribute information of the header from the image output processing unit 315.

The header complementing unit 332 then passes the obtained attribute information to the image output processing unit 325. The image output processing unit 325 generates the complementary image based on the attribute information received from the header complementing unit 332, and outputs the generated complementary image as the right-eye object image R2, at the same image output scheduled time as the left-eye object image L2.

Hence, in a period during which the left-eye object image L2 and the right-eye object image R2 are supposed to be displayed, the left-eye object image L2 and the complementary image are displayed in 3D, as shown in FIG. 8. Since 3D display is maintained, the viewer's discomfort can be alleviated.

As described above, when the image output preparation of one of the left-eye object image and the right-eye object image is not completed, in detail, when one of the header of the left-eye object image and the header of the right-eye object image is nonconforming, the 3D video processor 100 according to the second embodiment generates the complementary image using the other one of the header of the left-eye object image and the header of the right-eye object image, and outputs the generated complementary image instead of the image corresponding to the nonconforming header.

Thus, the 3D video processor 100 according to the second embodiment alleviates both the viewer's discomfort that the object image is displayed in 2D due to the nonconforming header, and the viewer's discomfort that information which is supposed to be provided is missing.

The header of the left-eye object image and the header of the right-eye object image include the common attribute information. Accordingly, even when the attribute information of one of the headers cannot be used due to an error, the attribute information of the other header can be used to generate the complementary image. As a result, 3D display can be maintained with the complementary image and the image not having the error. This alleviates the viewer's discomfort that the object image is displayed in 2D. Moreover, by generating and outputting the complementary image, the object image that would not have been displayed due to the error can be outputted. Therefore, more information can be provided to the viewer.

(Third Embodiment)

A 3D video processor according to a third embodiment of the present invention includes an image output synchronization unit that determines whether or not the image output preparation of both the left-eye object image and the right-eye object image is completed by the image output scheduled time and, when the image output preparation of one of the left-eye object image and the right-eye object image is not completed, skips the image output of both the left-eye object image and the right-eye object image.

That is, the 3D video processor according to the third embodiment differs from the 3D video processor according to the first embodiment in that whether or not to skip the image output is determined by determining whether or not the image output preparation is completed by the predetermined time, instead of determining whether or not the header is nonconforming.

The following mainly describes the differences from the first embodiment, while omitting the same parts as the first embodiment. In detail, since the coded stream separation and the main video processing are the same as in the first embodiment, their description is omitted, and the object image processing is mainly described below.

Figure 9:
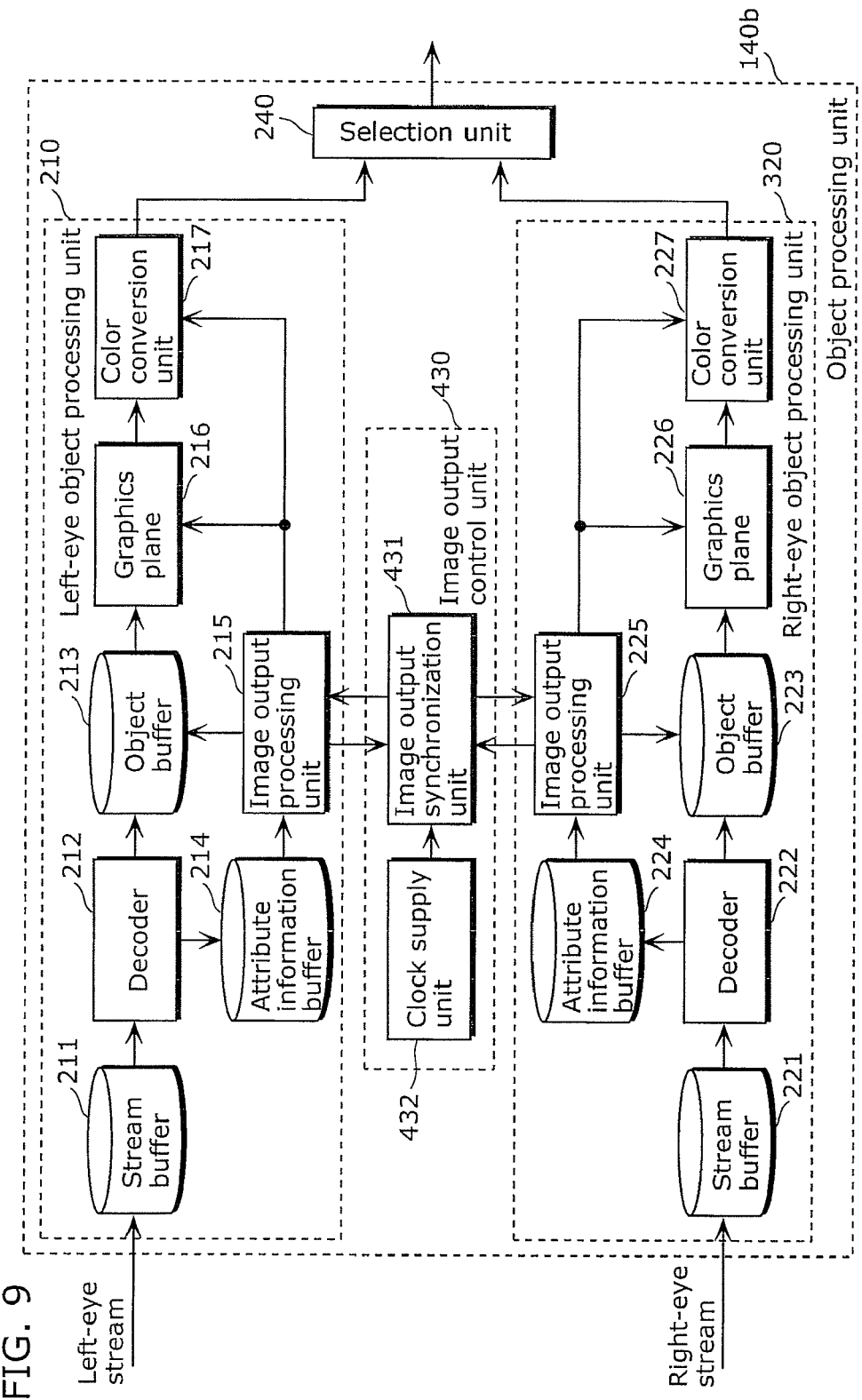
FIG. 9 is a block diagram showing a structure of an object processing unit according to a third embodiment of the present invention.

FIG. 9 is a block diagram showing a structure of an object processing unit 140*b* according to the third embodiment. Note that the object processing unit 140*b* corresponds to the object processing unit 140 shown in FIG. 1.

The object processing unit 140*b* shown in FIG. 9 differs from the object processing unit 140 shown in FIG. 3 in that an image output control unit 430 is included instead of the image output control unit 230. The image output control unit 430 includes an image output synchronization unit 431 and a clock supply unit 432.

The image output synchronization unit 431 synchronizes the left-eye object image and the right-eye object image. In detail, based on the PTS included in the preparation completion notification from each of the image output processing units 215 and 225, the image output synchronization unit 431 issues the image output instruction to each of the image output processing units 215 and 225 so that the left-eye object image and the right-eye object image having the same PTS are outputted at the same time indicated by the PTS.

In more detail, when the image output synchronization unit 431 receives the preparation completion notification from one of the image output processing units 215 and 225, the image output synchronization unit 431 compares the time indicated by the PTS included in the received preparation completion notification with a reference clock supplied from the clock supply unit 432, to determine the image output scheduled time. Subsequently, when the image output synchronization unit 431 receives the preparation completion notification of the image having the same PTS from the other one of the image output processing units 215 and 225 by the image output scheduled time, the image output synchronization unit 431 issues the image output instruction to both the image output processing units 215 and 225 at the image output scheduled time.

When the image output synchronization unit 431 does not receive the preparation completion notification of the image having the same PTS from the other one of the image output processing units 215 and 225, that is, when the image output preparation of the other one of the left-eye object image and the right-eye object image is not completed, the image output synchronization unit 431 issues the image output skip instruction to both the image output processing units 215 and 225.

The clock supply unit 432 supplies the reference clock to the image output synchronization unit 431. The reference clock is a clock signal of a predetermined frequency.

According to the above structure, when the image output preparation of one of the left-eye object image and the right-eye object image is not completed by the predetermined image output scheduled time, the object processing unit 140b according to the third embodiment skips the image output of both the left-eye object image and the right-eye object image. In detail, in the case where the preparation completion notification is issued from one of the image output processing units 215 and 225, the image output synchronization unit 431 skips the image output of both the left-eye object image and the right-eye object image when, by the time indicated by the PTS included in the preparation completion notification, the preparation completion notification is not issued from the other one of the image output processing units 215 and 225.

The 3D video processor 100 according to the third embodiment maintains 3D display by such skipping the image output. This alleviates the viewer's discomfort that the object image for which the image output preparation is completed is displayed in 2D.

The following describes an image output-related operation of the object processing unit 140b according to the third embodiment. A situation where the image output preparation of the right-eye object image is not completed by the image output scheduled time is described below, for simplicity's sake. Since the same applies to a situation where the image output preparation of the left-eye object image is not completed, its description is omitted.

Figure 10:
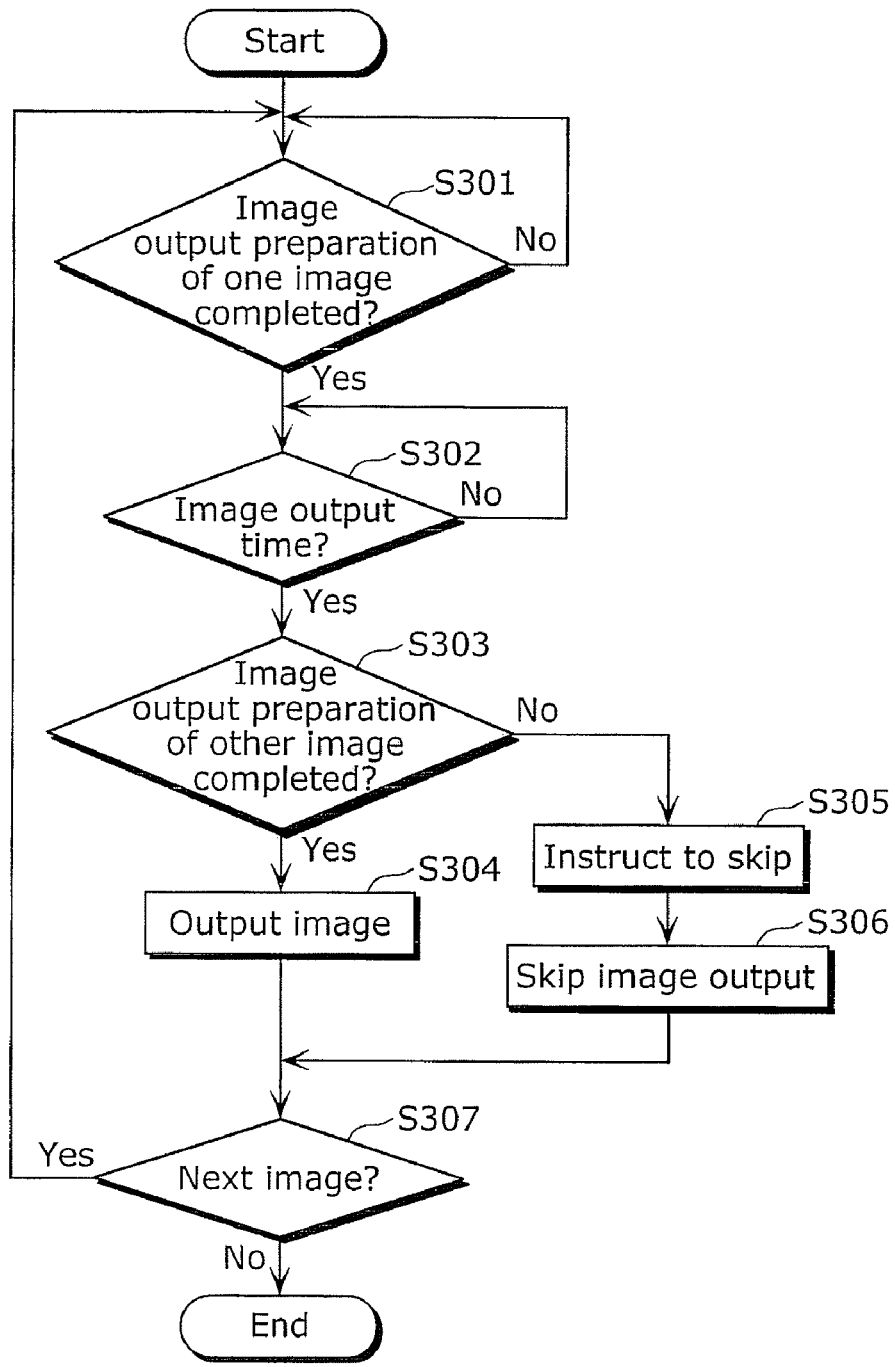
FIG. 10 is a flowchart showing an image output-related operation of the object processing unit according to the third embodiment.

FIG. 10 is a flowchart showing the image output-related operation of the object processing unit 140b according to the third embodiment.

First, the image output synchronization unit 431 waits for receiving the preparation completion notification from one of the image output processing units 215 and 225 (Step S301). For example, when the image output synchronization unit 431 receives the preparation completion notification of the left-eye object image from the image output processing unit 215 (Step S301: Yes), the image output synchronization unit 431 compares the PTS included in the preparation completion notification with the reference clock supplied from the clock supply unit 432, to determine the image output scheduled time. The image output synchronization unit 431 then waits for receiving the preparation completion notification of the right-eye object image from the image output processing unit 225, until the image output scheduled time is reached (Step S302).

When the image output scheduled time is reached (Step S302: Yes) and the preparation completion notification is already received from the other one of the image output processing units 215 and 225 (the image output processing unit 225 in this example) (Step S303: Yes), the image output synchronization unit 431 issues the image output instruction to both the image output processing units 215 and 225. The image output processing units 215 and 225 respectively output the left-eye object image and the right-eye object image at the image output scheduled time (Step S304).

When the image output scheduled time is reached (Step S302: Yes) and the preparation completion notification is not received from the image output processing unit 225 (Step S303: No), the image output synchronization unit 431 issues the image output skip instruction to both the image output processing units 215 and 225 (Step S305). Having received the image output skip instruction, the image output processing units 215 and 225 respectively skip the image output of the left-eye object image and the right-eye object image corresponding to the image output scheduled time (Step S306). The image output processing units 215 and 225 also respectively clear data on the graphics planes 216 and 226.

The above processing (Steps S301 to S306) is repeated until there is no image to be outputted next (Step S307).

Thus, the object processing unit 140b according to the third embodiment determines whether or not the image output preparation of one of the left-eye object image and the right-eye object image is completed by the predetermined image output scheduled time, by comparison with the reference clock.

When determining that the image output preparation of one of the left-eye object image and the right-eye object image is not completed by the predetermined image output scheduled time, the object processing unit 140b skips the image output of both the left-eye object image and the right-eye object image. That is, the object processing unit 140b suppresses the image output of both the left-eye object image and the right-eye object image, and executes the processing of the next object image.

As mentioned earlier, the left-eye stream and the right-eye stream can be decoded independently of each other, and so there is no need to synchronize the left-eye object processing unit 210 and the right-eye object processing unit 220 except for the image output timing. Since it is difficult for the image output control unit 430 to predict whether the left-eye object processing unit 210 or the right-eye object processing unit 220 completes the image output preparation first, it is preferable that the image output synchronization unit 431 waits for the preparation completion notification from one of the left-eye object processing unit 210 and the right-eye object processing unit 220 before determining the image output scheduled time, as described above.

Object image display as a result of the processing by the object processing unit 140b according to the third embodiment is the same as in FIGS. 5A and 5B.

As described above, when the image output preparation of one of the left-eye object image and the right-eye object image is not completed by the predetermined image output scheduled time, the 3D video processor 100 according to the third embodiment skips the image output of both the left-eye object image and the right-eye object image.

By skipping the image output of the image for which the image output preparation is not completed in such a way, the 3D video processor 100 according to the third embodiment maintains 3D display. This alleviates the viewer's discomfort that the image for which the image output preparation is completed is displayed in 2D.

(Fourth Embodiment)

A 3D video processor according to a fourth embodiment of the present invention includes an image output synchronization unit that determines whether or not the image output preparation of both the left-eye object image and the right-eye object image is completed by the image output scheduled time and, when the image output preparation of one of the left-eye object image and the right-eye object image is completed but the image output preparation of the other one of the left-eye object image and the right-eye object image is not completed by the image output scheduled time, outputs a first image for which the image output preparation is completed, as a second image for which the image output preparation is not completed.

That is, the 3D video processor according to the fourth embodiment differs from the 3D video processor according to the third embodiment in that the image for which the image output preparation is completed is outputted as the other image for which the image output preparation is not completed, instead of skipping the image output of both the left-eye object image and the right-eye object image. As a result, 2D display temporarily appears only at the corresponding image output scheduled time.

The following mainly describes the differences from the third embodiment, while omitting the same parts as the third embodiment. In detail, since the coded stream separation and the main video processing are the same as in the third embodiment, their description is omitted, and the object image processing is mainly described below.

Figure 11:
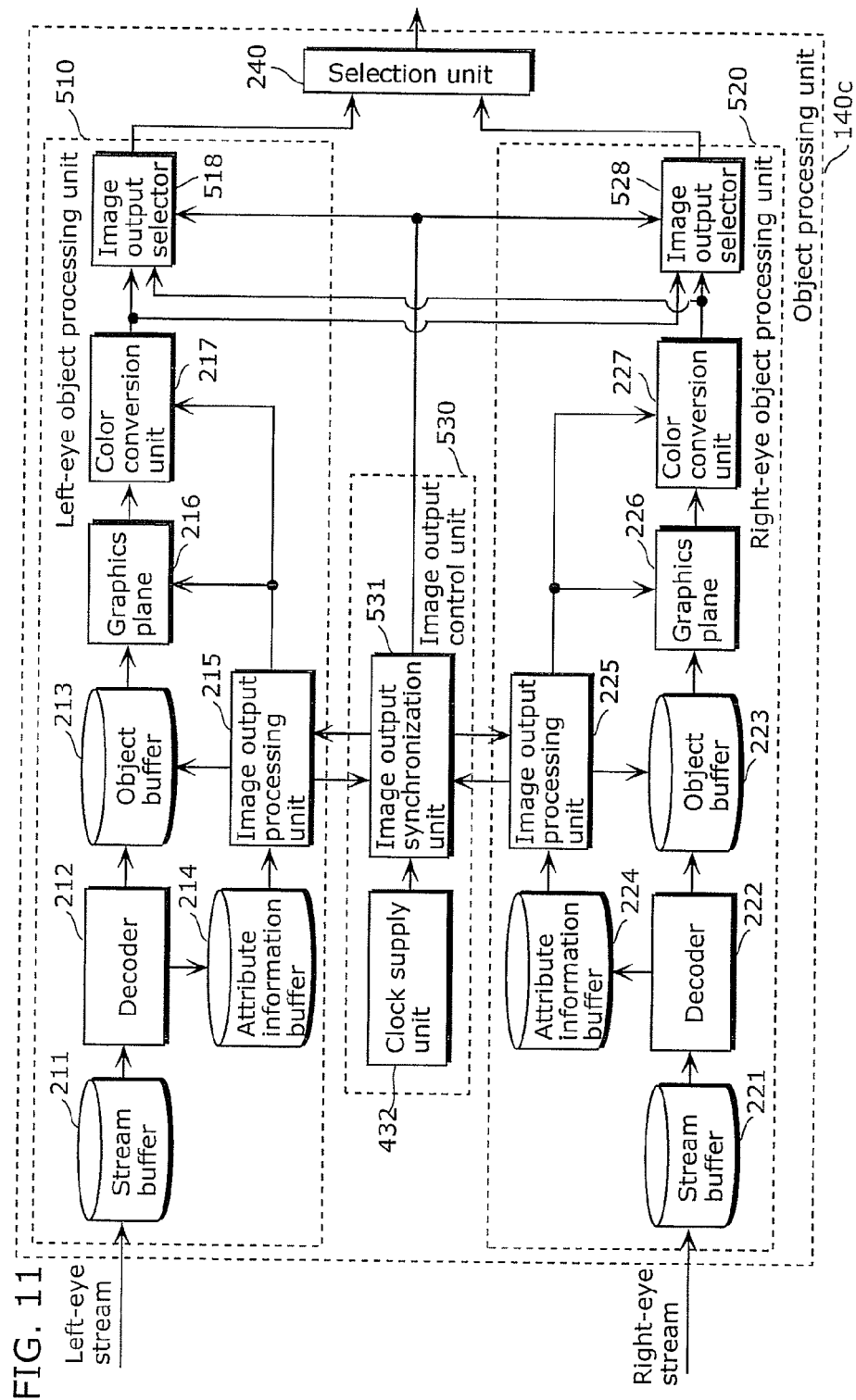
FIG. 11 is a block diagram showing a structure of an object processing unit according to a fourth embodiment of the present invention.

FIG. 11 is a block diagram showing a structure of an object processing unit 140c according to the fourth embodiment. Note that the object processing unit 140c corresponds to the object processing unit 140 shown in FIG. 1.

The object processing unit 140c shown in FIG. 11 differs from the object processing unit 140b shown in FIG. 9 in that a left-eye object processing unit 510, a right-eye object processing unit 520, and an image output control unit 530 are included instead of the left-eye object processing unit 210, the right-eye object processing unit 220, and the image output control unit 430.

In detail, the left-eye object processing unit 510 differs from the left-eye object processing unit 210 in that an image output selector 518 is newly included. The right-eye object processing unit 520 differs from the right-eye object processing unit 220 in that an image output selector 528 is newly included. The image output control unit 530 differs from the image output control unit 430 in that an image output synchronization unit 531 is included instead of the image output synchronization unit 431.

The image output selectors 518 and 528 each select, according to control by the image output control unit 530, the left-eye object image outputted from the color conversion unit 217 or the right-eye object image outputted from the color conversion unit 227, and output the selected image to the selection unit 240. For example, according to an image selection instruction from the image output control unit 530 indicating the left-eye object image or the right-eye object image to be selected, the image output selectors 518 and 528 each select the image indicated by the image selection instruction.

The image output synchronization unit 531 operates in the same way as the image output synchronization unit 431 according to the third embodiment. When the completion of the image output preparation of both the left-eye object image and the right-eye object image is not achieved by the image output scheduled time, however, the image output synchronization unit 531 performs the following processing.

When the completion of the image output preparation of both the left-eye object image and the right-eye object image is not achieved by the image output scheduled time, that is, when the image output synchronization unit 531 does not receive the preparation completion notification from one of the image output processing units 215 and 225, the image output synchronization unit 531 controls the image output selectors 518 and 528 so that the same image is outputted from the left-eye object processing unit 510 and the right-eye object processing unit 520.

For example, when the image output synchronization unit 531 receives the preparation completion notification from the image output processing unit 215 but does not receive the preparation completion notification from the image output processing unit 225, the image output synchronization unit 531 instructs the image output selectors 518 and 528 to select the left-eye object image outputted from the color conversion unit 217. That is, the image output synchronization unit 531 issues the image selection instruction indicating the left-eye object image, to the image output selectors 518 and 528.

Here, the image output selectors 518 and 528 may normally select the left-eye object image and the right-eye object image respectively and, only when receiving a selection switch instruction from the image output synchronization unit 531, select the right-eye object image and the left-eye object image respectively. The selection switch instruction is an instruction to select an image different from a normally selected image. In this case, the image output synchronization unit 531 outputs the selection switch instruction only to one of the image output selectors 518 and 528 that is included in the object processing unit not completing the image output preparation.

According to the above structure, when the image output preparation of one of the left-eye object image and the right-eye object image is not completed by the predetermined image output scheduled time, the object processing unit 140c according to the fourth embodiment outputs the other image for which the image output preparation is completed, as the image for which the image output preparation is not completed. In detail, the left-eye object image is outputted instead of the right-eye object image, or the right-eye object image is outputted instead of the left-eye object image. As a result, the object image corresponding to the image output scheduled time is displayed in 2D.

Thus, the 3D video processor 100 according to the fourth embodiment can display information necessary for the viewer even in 2D, though there is a disadvantage that the display is in 2D. This alleviates the viewer's discomfort that information which is supposed to be provided is missing.

The following describes an image output-related operation of the object processing unit 140c according to the fourth embodiment. A situation where the image output preparation of the right-eye object image is not completed by the image output scheduled time is described below, for simplicity's sake. Since the same applies to a situation where the image output preparation of the left-eye object image is not completed, its description is omitted.

Figure 12:
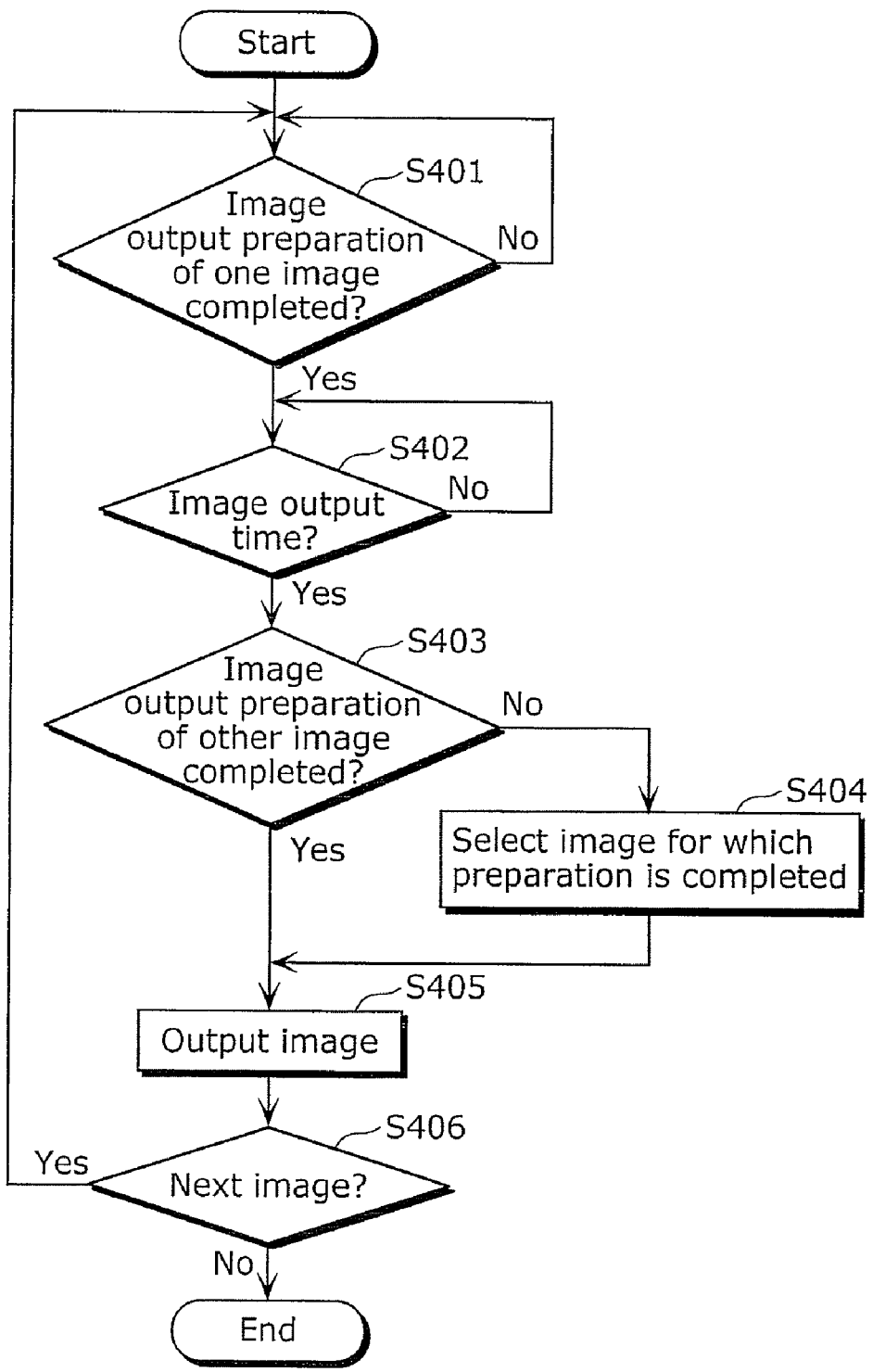
FIG. 12 is a flowchart showing an image output-related operation of the object processing unit according to the fourth embodiment.

FIG. 12 is a flowchart showing the image output-related operation of the object processing unit 140c according to the fourth embodiment.

First, the image output synchronization unit 531 waits for receiving the preparation completion notification from one of the image output processing units 215 and 225 (Step S401). For example, when the image output synchronization unit 531 receives the preparation completion notification of the left-eye object image from the image output processing unit 215 (Step S401: Yes), the image output synchronization unit 531 compares the PTS included in the preparation completion notification with the reference clock supplied from the clock supply unit 432, to determine the image output scheduled time. The image output synchronization unit 531 then waits for receiving the preparation completion notification of the right-eye object image from the image output processing unit 225, until the image output scheduled time is reached (Step S402).

When the image output scheduled time is reached (Step S402: Yes) and the preparation completion notification is already received from the other one of the image output processing units 215 and 225 (the image output processing unit 225 in this example) (Step S403: Yes), the image output synchronization unit 531 issues the image output instruction to both the image output processing units 215 and 225. The image output processing units 215 and 225 respectively output the left-eye object image and the right-eye object image at the image output scheduled time (Step S405).

When the image output scheduled time is reached (Step S402: Yes) and the preparation completion notification is not received from the image output processing unit 225 (Step S403: No), the image output synchronization unit 531 controls the image output selectors 518 and 528 to select the left-eye object image for which the image output preparation is completed (Step S404). As a result, the image output selectors 518 and 528 both output the left-eye object image for which the image output preparation is completed (Step S405).

The above processing (Steps S401 to S405) is repeated until there is no image to be outputted next (Step S406).

Thus, the object processing unit 140c according to the fourth embodiment determines whether or not the image output preparation of one of the left-eye object image and the right-eye object image is completed by the predetermined image output scheduled time, by comparison with the reference clock.

When determining that the image output preparation of one of the left-eye object image and the right-eye object image is not completed by the predetermined image output scheduled time, the object processing unit 140c outputs the other one of the left-eye object image and the right-eye object image for which the image output preparation is completed, as the image for which the image output preparation is not completed.

As mentioned earlier, the left-eye stream and the right-eye stream can be decoded independently of each other, and so there is no need to synchronize the left-eye object processing unit 510 and the right-eye object processing unit 520 except for the image output timing. Since it is difficult for the image output control unit 530 to predict whether the left-eye object processing unit 510 or the right-eye object processing unit 520 completes the image output preparation first, it is preferable that the image output synchronization unit 531 waits for the preparation completion notification from one of the left-eye object processing unit 510 and the right-eye object processing unit 520 before determining the image output scheduled time, as described above.

Figure 13:
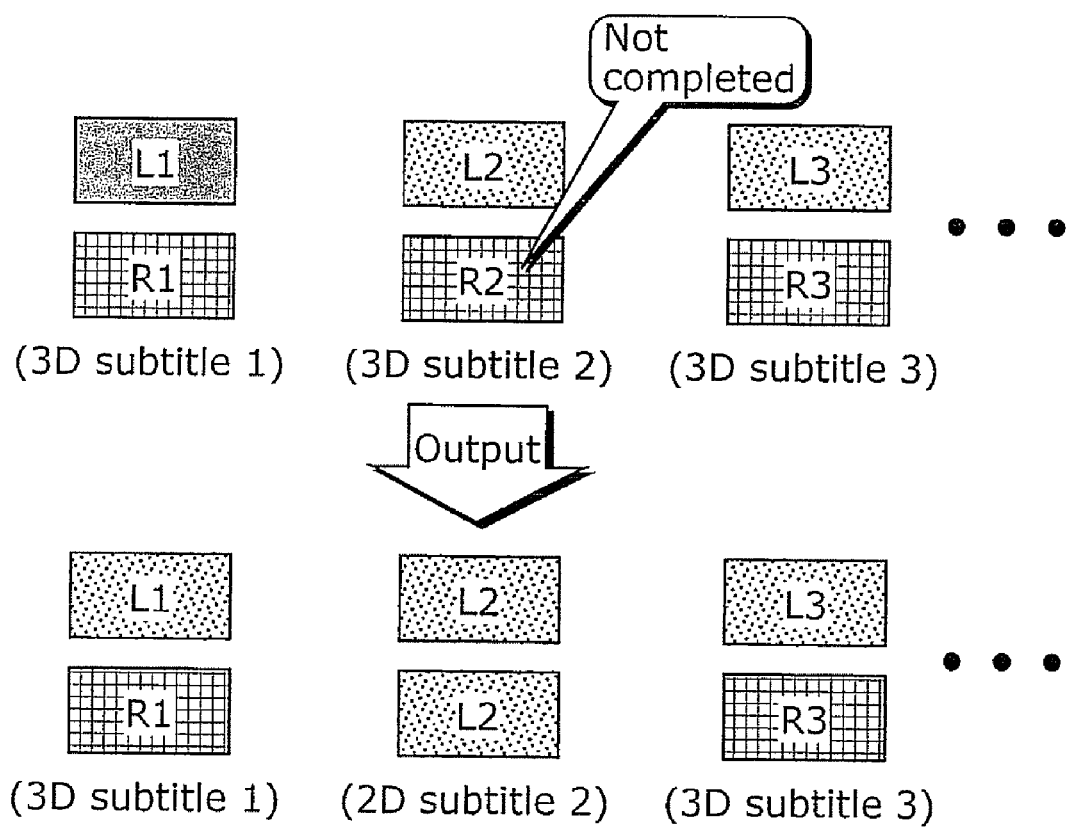
FIG. 13 is a schematic diagram showing images outputted when image output preparation is not completed, according to the fourth embodiment.

FIG. 13 is a schematic diagram showing images outputted when the image output preparation is not completed, according to the fourth embodiment.

A situation where the image output preparation of the right-eye object image R2 is not completed is described below, as shown in FIG. 13. The image output synchronization unit 531 controls the image output selectors 518 and 528 to select the left-eye object image L2 for which the image output preparation is completed. As a result, the left-eye object image L2 is displayed instead of the right-eye object image R2, as shown in FIG. 13. Hence, in a period during which the left-eye object image L2 and the right-eye object image R2 are supposed to be displayed, the left-eye object image is displayed in 2D.

Such 2D display might cause some discomfort to the viewer. However, the information that is supposed to be provided to the viewer can be displayed. This enables the viewer to view all information without missing any necessary information, so that the viewer's discomfort that certain information is missing can be alleviated.

As described above, when the image output preparation of one of the left-eye object image and the right-eye object image is not completed by the predetermined image output scheduled time, the 3D video processor 100 according to the fourth embodiment outputs the other image for which the image output preparation is completed, as the image for which the image output preparation is not completed.

Thus, the 3D video processor 100 according to the fourth embodiment can display information necessary for the viewer even in 2D, though there is a disadvantage that the display is in 2D. This alleviates the viewer's discomfort that information which is supposed to be provided is missing.

(Fifth Embodiment)

A 3D video processor according to a fifth embodiment of the present invention determines whether or not the left-eye object image or the right-eye object image is erasure data for erasing a preceding image that remains displayed. When determining that the image output preparation of a first image which is one of the left-eye object image and the right-eye object image is not completed, that the image output preparation of a second image which is the other one of the left-eye object image and the right-eye object image is completed, and that the first image or the second image is the erasure data, the 3D video processor according to the fifth embodiment outputs the second image as the first image.

That is, the 3D video processor according to the fifth embodiment differs from the 3D video processor according to the fourth embodiment in that whether or not the image for which the image output preparation is completed is the erasure data is determined and, when the image is the erasure data, the erasure data is outputted as the left-eye object image and the right-eye object image.

The following mainly describes the differences from the fourth embodiment, while omitting the same parts as the fourth embodiment. In detail, since the coded stream separation and the main video processing are the same as in the fourth embodiment, their description is omitted, and the object image processing is mainly described below.

Figure 14:
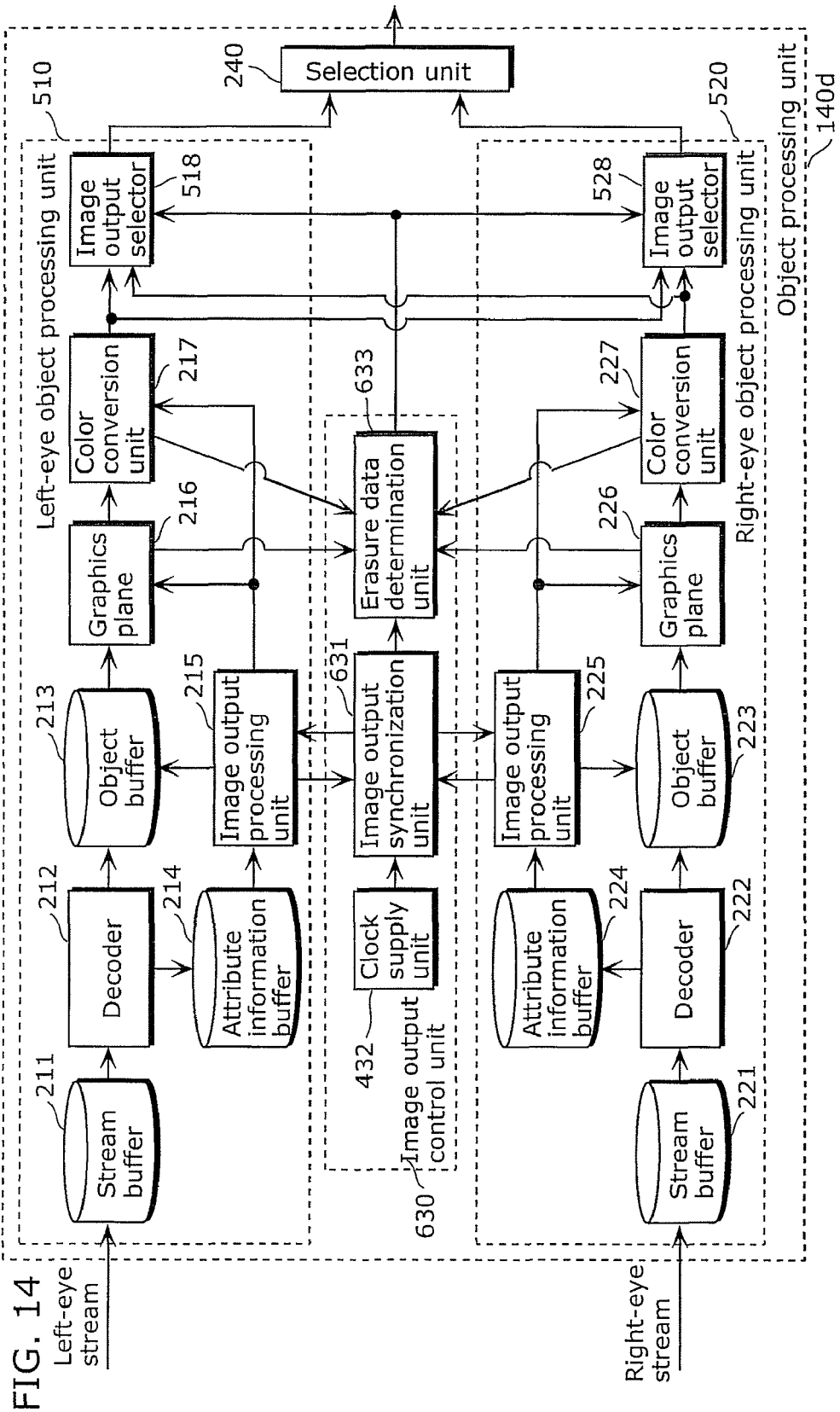
FIG. 14 is a block diagram showing a structure of an object processing unit according to a fifth embodiment of the present invention.

FIG. 14 is a block diagram showing a structure of an object processing unit 140d according to the fifth embodiment. Note that the object processing unit 140d corresponds to the object processing unit 140 shown in FIG. 1.

The object processing unit 140d shown in FIG. 14 differs from the object processing unit 140c shown in FIG. 11 in that an image output control unit 630 is included instead of the image output control unit 530. The image output control unit 630 differs from the image output control unit 530 shown in FIG. 11 in that an image output synchronization unit 631 is included instead of the image output synchronization unit 531, and also an erasure data determination unit 633 is newly included.

The image output synchronization unit 631 operates in the same way as the image output synchronization unit 531 according to the fourth embodiment. In addition, when the image output scheduled time is reached and the image output preparation of the other one of the left-eye object image and the right-eye object image is not completed, the image output synchronization unit 631 issues a synchronization delay notification to the erasure data determination unit 633.

The synchronization delay notification is a notification that the image output preparation of one of the left-eye object image and the right-eye object image is completed but the image output preparation of the other one of the left-eye object image and the right-eye object image is not completed. The synchronization delay notification includes information indicating the image for which the image output preparation is not completed and the image for which the image output preparation is completed.

The erasure data determination unit 633 determines whether or not the image for which the image output preparation is completed is the erasure data for erasing the preceding image that remains displayed. In detail, when receiving the synchronization delay notification from the image output synchronization unit 631, the erasure data determination unit 633 determines whether or not the image for which the image output preparation is completed is the erasure data, with reference to one of the graphics planes 216 and 226 and one of the color conversion units 217 and 227. Note that the erasure data is actually a transparent image through which the superimposition target image (such as the left-eye main video and the right-eye main video) can be seen.

Note that the erasure data determination may be made by determining whether or not the image output processing unit 215 or 225 performs rendering on the graphics plane 216 or 226. When the image output processing unit 215 or 225 does not perform rendering on the graphics plane 216 or 226, the image for which the image output preparation is completed is the erasure data.

When determining that the image for which the image output preparation is completed is the erasure data, the erasure data determination unit 633 controls the image output selectors 518 and 528 to select the erasure data. When determining that the image for which the image output preparation is completed is not the erasure data, on the other hand, the erasure data determination unit 633 issues the image output skip instruction to both the image output processing units 215 and 225.

According to the above structure, when the image output preparation of one of the left-eye object image and the right-eye object image is completed but the image output preparation of the other one of the left-eye object image and the right-eye object image is not completed by the predetermined image output scheduled time, the object processing unit 140*d* according to the fifth embodiment determines whether or not the image for which the image output preparation is completed is the erasure data. When the image is the erasure data, the object processing unit 140*d* outputs the erasure data, as the left-eye object image and the right-eye object image. When the image is not the erasure data, the object processing unit 140*d* skips the image output of both the left-eye object image and the right-eye object image corresponding to the image output scheduled time.

The erasure data is a transparent image, which may be displayed irrespective of 2D or 3D. Accordingly, by outputting the erasure data, the preceding image that remains displayed can be erased, while preventing 2D display. This alleviates the viewer's discomfort that the object image is displayed in 2D, and also prevents a situation where an image of a different image output scheduled time remains displayed.

The following describes an image output-related operation of the object processing unit 140*d* according to the fifth embodiment. A situation where the image output preparation of the right-eye object image is not completed by the image output scheduled time is described below, for simplicity's sake. Since the same applies to a situation where the image output preparation of the left-eye object image is not completed, its description is omitted.

Figure 15:
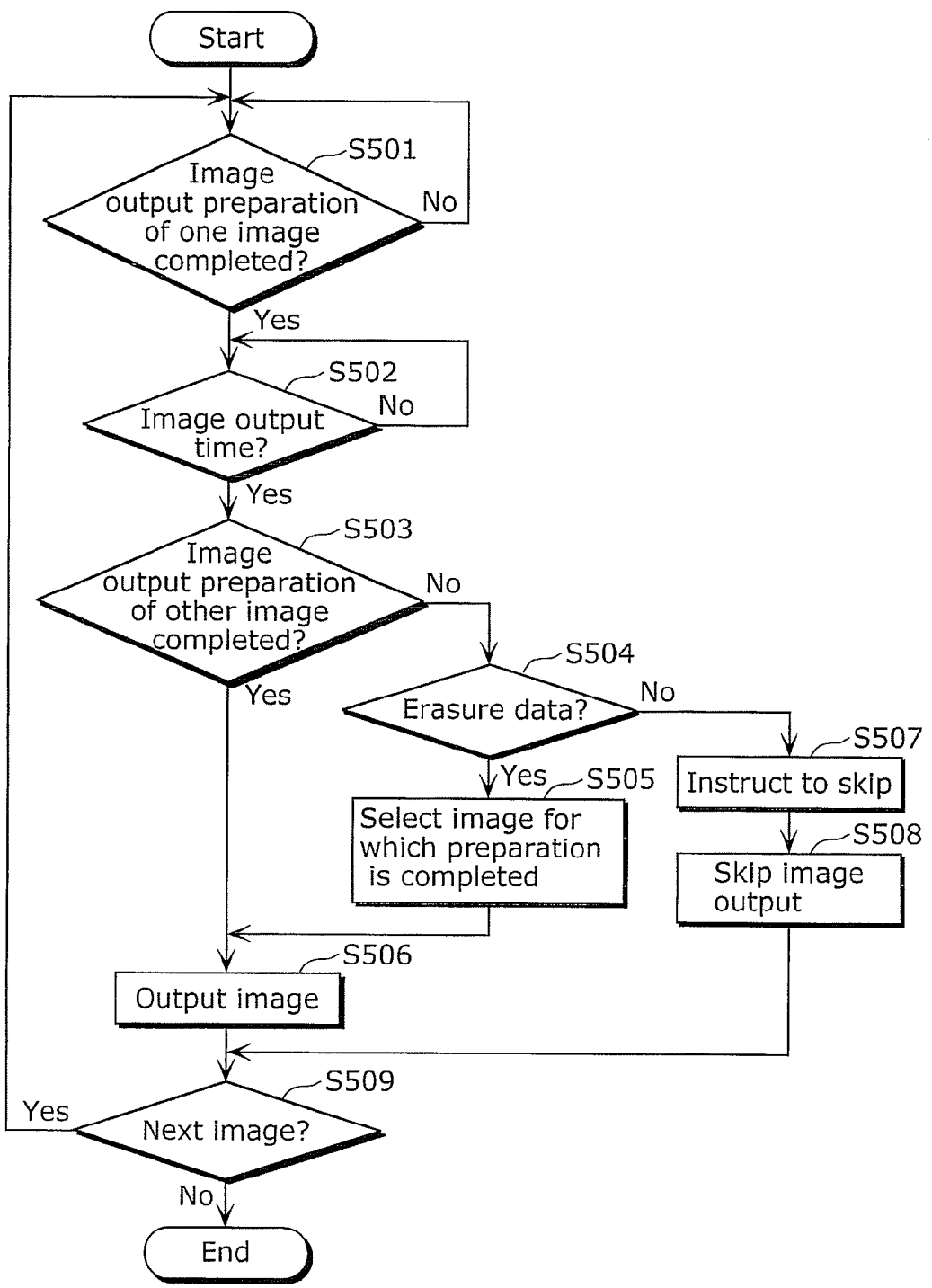
FIG. 15 is a flowchart showing an image output-related operation of the object processing unit according to the fifth embodiment.

FIG. 15 is a flowchart showing the image output-related operation of the object processing unit 140*d* according to the fifth embodiment.

First, the image output synchronization unit 631 waits for receiving the preparation completion notification from one of the image output processing units 215 and 225 (Step S501). For example, when the image output synchronization unit 631 receives the preparation completion notification of the left-eye object image from the image output processing unit 215 (Step S501: Yes), the image output synchronization unit 631 compares the PTS included in the preparation completion notification with the reference clock supplied from the clock supply unit 432, to determine the image output scheduled time. The image output synchronization unit 631 then waits for receiving the preparation completion notification of the right-eye object image from the image output processing unit 225, until the image output scheduled time is reached (Step S502).

When the image output scheduled time is reached (Step S502: Yes) and the preparation completion notification is already received from the other one of the image output processing units 215 and 225 (the image output processing unit 225 in this example) (Step S503: Yes), the image output synchronization unit 631 issues the image output instruction to both the image output processing units 215 and 225. The image output processing units 215 and 225 respectively output the left-eye object image and the right-eye object image at the image output scheduled time (Step S506).

When the image output scheduled time is reached (Step S502: Yes) and the preparation completion notification is not received from the image output processing unit 225 (Step S503: No), the image output synchronization unit 631 issues the synchronization delay notification to the erasure data determination unit 633. Having received the synchronization delay notification, the erasure data determination unit 633 determines whether or not the left-eye object image for which the image output preparation is completed is the erasure data (Step S504).

When determining that the left-eye object image for which the image output preparation is completed is the erasure data (Step S504: Yes), the erasure data determination unit 633 controls the image output selectors 518 and 528 to select the left-eye object image for which the image output preparation is completed (Step S505). As a result, the image output selectors 518 and 528 both output the left-eye object image for which the image output preparation is completed, that is, the erasure data (Step S506).

When determining that the left-eye object image for which the image output preparation is completed is not the erasure data (Step S504: No), the erasure data determination unit 633 issues the image output skip instruction to both the image output processing units 215 and 225 (Step S507). Having received the image output skip instruction, the image output processing units 215 and 225 respectively skip the image output of the left-eye object image and the right-eye object image corresponding to the image output scheduled time (Step S508). The image output processing units 215 and 225 also respectively clear data on the graphics planes 216 and 226.

The above processing (Steps S501 to S508) is repeated until there is no image to be outputted next (Step S509).

Thus, the object processing unit 140*d* according to the fifth embodiment determines whether or not the image output preparation of one of the left-eye object image and the right-eye object image is completed by the predetermined image output scheduled time, by comparison with the reference clock. When determining that the image output preparation of one of the left-eye object image and the right-eye object image is not completed by the predetermined image output scheduled time, the object processing unit 140*d* determines whether or not the image for which the image output preparation is completed is the erasure data.

When the image is the erasure data, the object processing unit 140*d* outputs the left-eye object image or the right-eye object image for which the image output preparation is completed, that is, the erasure data, as the image for which the image output preparation is not completed. When the image is not the erasure data, the object processing unit 140*d* skips the image output of both the left-eye object image and the right-eye object image.

Figure 16:
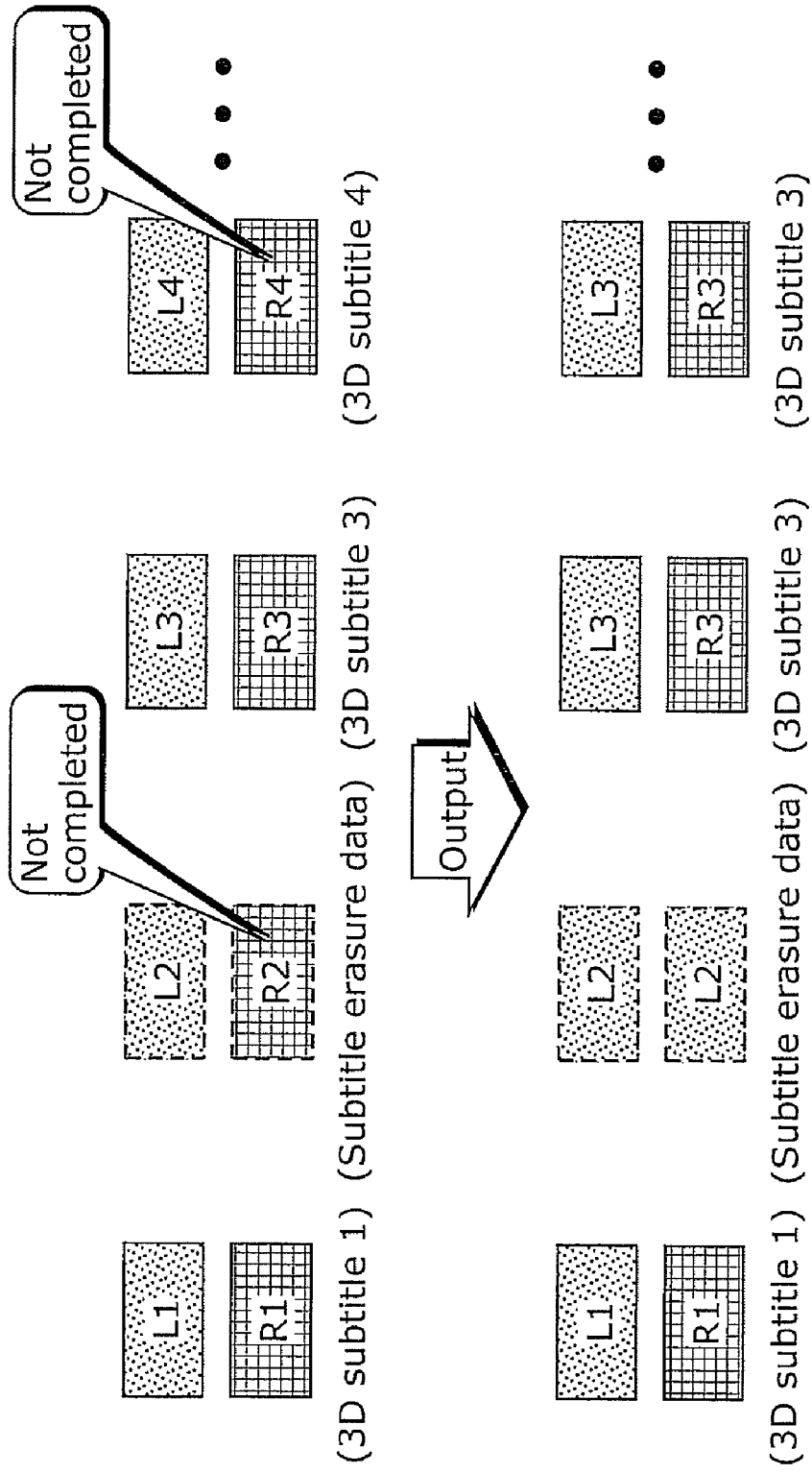
FIG. 16 is a schematic diagram showing images outputted when image output preparation is not completed, according to the fifth embodiment.

FIG. 16 is a schematic diagram showing images outputted when the image output preparation is not completed, according to the fifth embodiment.

A situation where the image output preparation of the right-eye object images R2 and R4 is not completed is described below, as shown in FIG. 16. It is assumed here that the right-eye object image R2 is the erasure data.

In a period during which the left-eye object image L2 and the right-eye object image R2 are supposed to be displayed, the erasure data determination unit 633 controls the image output selectors 518 and 528 to select the left-eye object image L2 for which the image output preparation is completed, that is, the erasure data. Hence, the left-eye object image L2 which is a transparent image (erasure data) is displayed instead of the right-eye object image R2, as shown in FIG. 16.

Moreover, in a period during which the left-eye object image L4 and the right-eye object image R4 are supposed to be displayed, the erasure data determination unit 633 issues the image output skip instruction to the image output processing units 215 and 225. Hence, in the period during which the left-eye object image L4 and the right-eye object image R4 are supposed to be displayed, the left-eye object image L3 and the right-eye object image R3 remain displayed.

The erasure data is a transparent image, which may be displayed irrespective of 2D or 3D. Accordingly, by outputting the erasure data, the preceding image that remains displayed can be erased, while preventing 2D display. Besides, when the image is not the erasure data, the image output is skipped, so that 3D display can be maintained as in the first embodiment. This alleviates the viewer's discomfort that the object image is displayed in 2D, and also prevents a situation where an image of a different image output scheduled time remains displayed.

As described above, when the image output preparation of one of the left-eye object image and the right-eye object image is not completed by the predetermined image output scheduled time and the other image for which the image output preparation is completed is the erasure data, the 3D video processor 100 according to the fifth embodiment outputs the other image for which the image output preparation is completed, that is, the erasure data, as the image for which the image output preparation is not completed.

The erasure data is a transparent image, which may be displayed irrespective of 2D or 3D. Accordingly, by outputting the erasure data, the preceding image that remains displayed can be erased, while preventing 2D display. This alleviates the viewer's discomfort that the object image is displayed in 2D, and also prevents a situation where an image of a different image output scheduled time remains displayed.

(Sixth Embodiment)

A 3D video processor according to a sixth embodiment of the present invention includes the following image output control unit. In the case where the preparation completion notification of one of the left-eye object image and the right-eye object image is not issued, when the preparation completion notification of the one of the left-eye object image and the right-eye object image is received during the time that a remaining period which is a period up to the image output of the next left-eye object image and the next right-eye object image is longer than a predetermined threshold, the image output control unit instructs to output the left-eye object image and the right-eye object image. When the preparation completion notification of the one of the left-eye object image and the right-eye object image is not received until the remaining period reaches the threshold, the image output control unit instructs to skip the image output of both the left-eye object image and the right-eye object image.

In other words, in the case where it is determined that the image output preparation of one of the left-eye object image and the right-eye object image is not completed, when the image output preparation of both the left-eye object image and the right-eye object image is completed during the time that the remaining period up to the image output of the next left-eye object image and the next right-eye object image is longer than the predetermined threshold, the 3D video processor according to the sixth embodiment outputs the left-eye object image and the right-eye object image. When the image output preparation of the one of the left-eye object image and the right-eye object image is not completed until the remaining period reaches the threshold, the 3D video processor according to the sixth embodiment skips the image output of both the left-eye object image and the right-eye object image.

That is, the 3D video processor according to the sixth embodiment differs from the 3D video processor according to the third embodiment in that it does not skip the image output immediately when the image output scheduled time of the left-eye object image and the right-eye object image is reached, but waits for the completion of the image output preparation for a predetermined period and, in the case where the image output preparation is not completed even when the predetermined period elapses, skips the image output of both the left-eye object image and the right-eye object image.

The following mainly describes the differences from the third embodiment, while omitting the same parts as the third embodiment. In detail, since the coded stream separation and the main video processing are the same as in the third embodiment, their description is omitted, and the object image processing is mainly described below.

Figure 17:
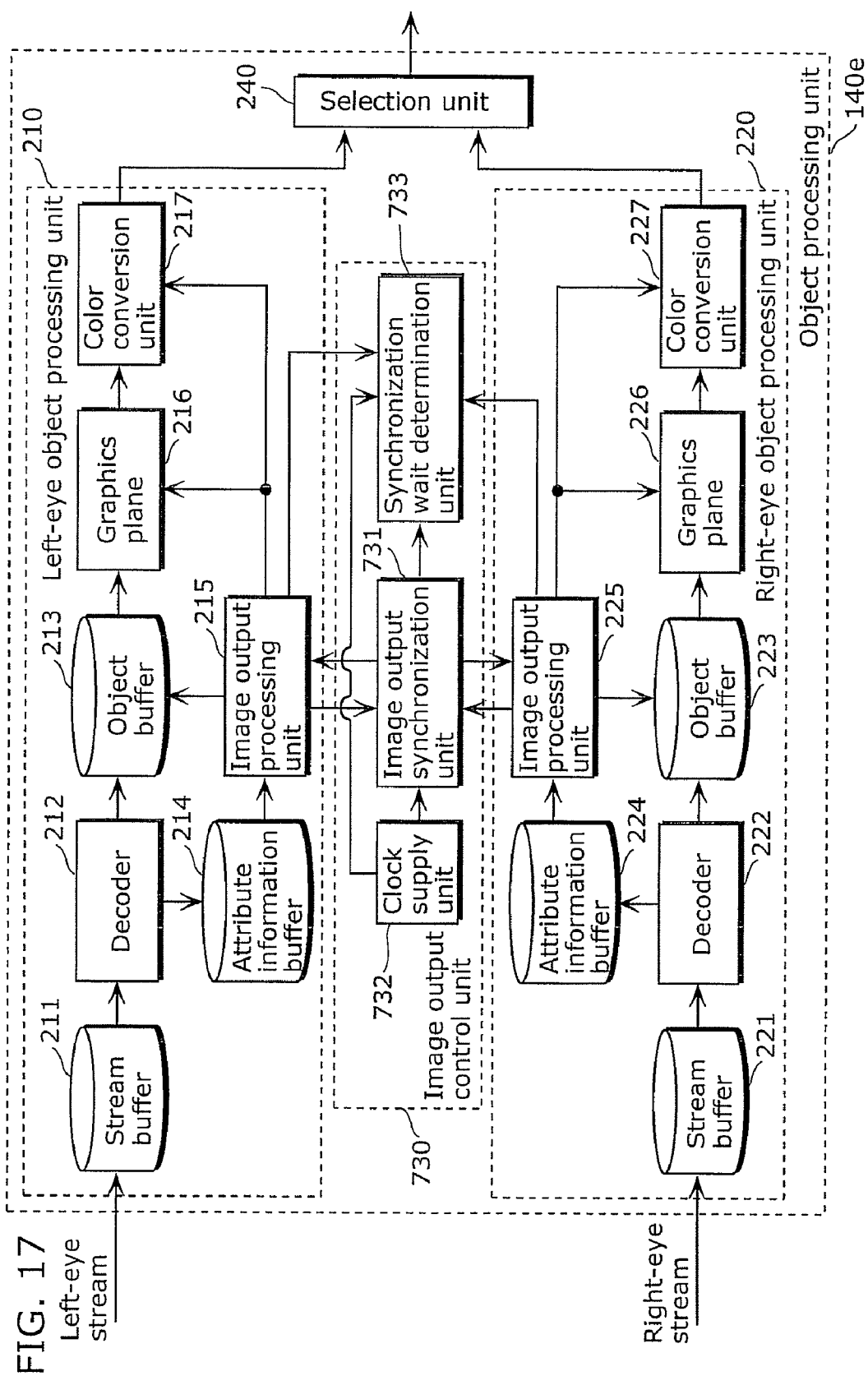
FIG. 17 is a block diagram showing a structure of an object processing unit according to a sixth embodiment of the present invention.

FIG. 17 is a block diagram showing a structure of an object processing unit 140*e* according to the sixth embodiment. Note that the object processing unit 140*e* corresponds to the object processing unit 140 shown in FIG. 1.

The object processing unit 140*e* shown in FIG. 17 differs from the object processing unit 140*b* shown in FIG. 9 in that an image output control unit 730 is included instead of the image output control unit 430. The image output control unit 730 includes an image output synchronization unit 731, a clock supply unit 732, and a synchronization wait determination unit 733.

The image output synchronization unit 731 operates in the same way as the image output synchronization unit 431 according to the third embodiment. When the completion of the image output preparation of both the left-eye object image and the right-eye object image is not achieved by the image output scheduled time, however, the image output synchronization unit 731 performs the following processing.

When the completion of the image output preparation of both the left-eye object image and the right-eye object image is not achieved by the image output scheduled time, that is, when the image output synchronization unit 731 does not receive the preparation completion notification from one of the image output processing units 215 and 225, the image output synchronization unit 731 does not issue the image output skip instruction immediately, but waits for the predetermined period. In other words, the image output synchronization unit 731 waits to issue the image output skip instruction, during the time that the remaining period up to the image output of the next left-eye object image and the next right-eye object image is longer than the predetermined threshold.

When the image output preparation of both the left-eye object image and the right-eye object image is completed during the wait, that is, when the image output synchronization unit 731 receives the preparation completion notification from the other one of the image output processing units 215 and 225 during the wait, the image output synchronization unit 731 issues the image output instruction to the image output processing units 215 and 225. Moreover, when the image output synchronization unit 731 receives the preparation completion notification of the next left-eye object image and the next right-eye object image corresponding to the next image output scheduled time during the wait, the image output synchronization unit 731 notifies the synchronization wait determination unit 733 of the next image output scheduled time (PTS).

When the image output synchronization unit 731 receives a synchronization wait cancel notification from the synchronization wait determination unit 733, the image output synchronization unit 731 issues the image output skip instruction to both the image output processing units 215 and 225. The synchronization wait cancel notification is a notification for causing the image output synchronization unit 731 to issue the image output skip instruction, and includes the PTS of the image to be skipped.

The clock supply unit 732 supplies a reference clock to the image output synchronization unit 731 and the synchronization wait determination unit 733. The reference clock is a clock signal of a predetermined frequency.

The synchronization wait determination unit 733, when receiving the next PTS from the image output synchronization unit 731, compares the time indicated by the next PTS with the reference clock supplied from the clock supply unit 732, to determine the image output scheduled time of the next image. That is, the synchronization wait determination unit 733 determines the remaining period for the image for which the image output synchronization unit 731 waits for the image output, based on the current time and the image output scheduled time of the next image.

When the remaining period reaches the predetermined threshold or less, the synchronization wait determination unit 733 issues the synchronization wait cancel notification to the image output synchronization unit 731. For example, the predetermined threshold is 0, or half a period during which one left-eye object image or one right-eye object image is to be outputted.

According to the above structure, when the image output preparation of one of the left-eye object image and the right-eye object image is not completed, the object processing unit 140e according to the sixth embodiment waits for the completion of the image output preparation for the predetermined period. In the case where the image output preparation is not completed even when the predetermined period elapses, the object processing unit 140e skips the image output of both the left-eye object image and the right-eye object image.

This contributes to a higher possibility that the image is outputted, and therefore alleviates the viewer's discomfort that information which is supposed to be provided is missing. Moreover, since the image output of both the left-eye object image and the right-eye object image is skipped when the image output preparation is not completed within the predetermined period, 3D display can be maintained. This alleviates the viewer's discomfort that the object image is displayed in 2D.

The following describes an image output-related operation of the object processing unit 140e according to the sixth embodiment. A situation where the image output preparation of the right-eye object image is not completed by the image output scheduled time is described below, for simplicity's sake. Since the same applies to a situation where the image output preparation of the left-eye object image is not completed, its description is omitted.

Figure 18:
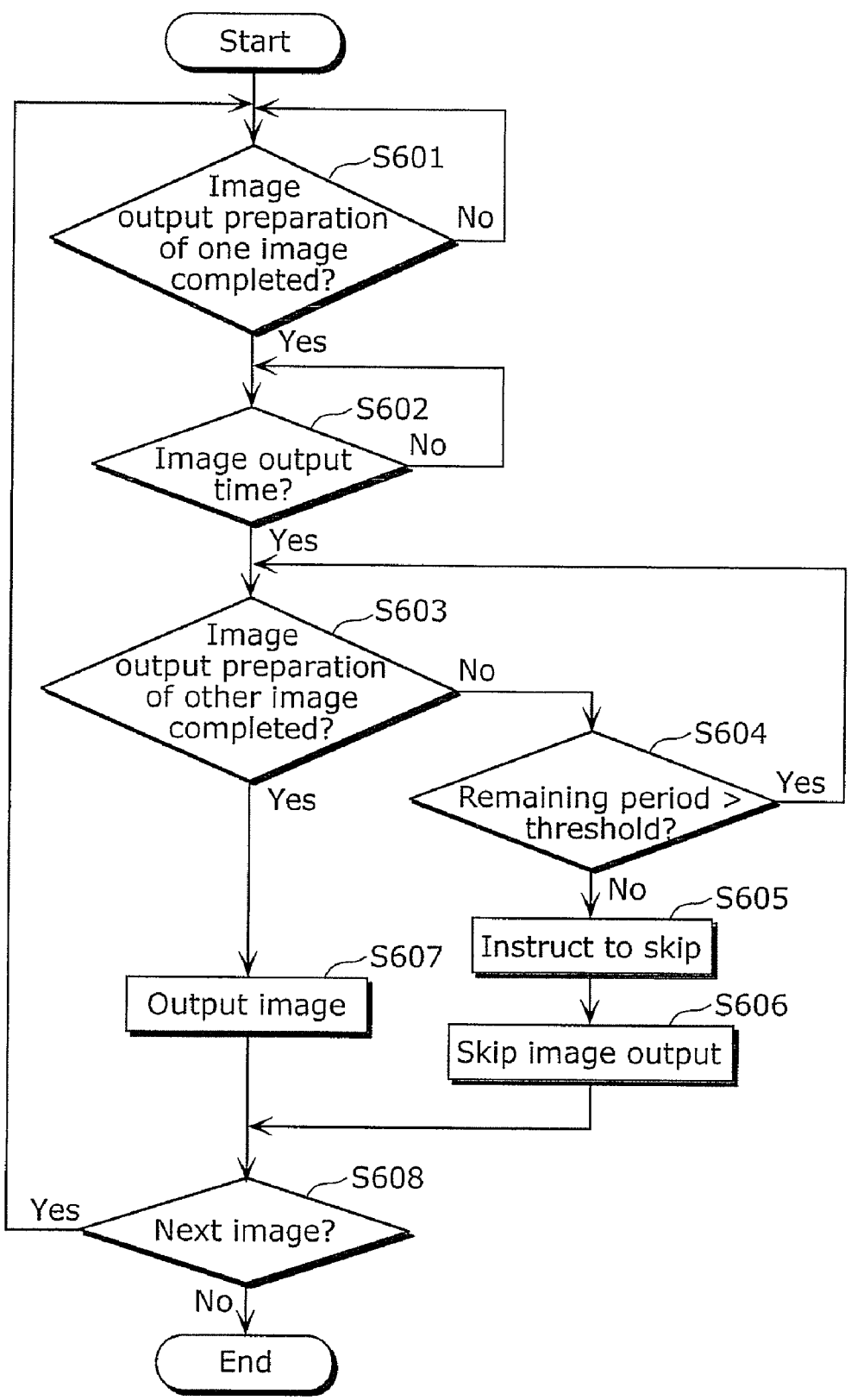
FIG. 18 is a flowchart showing an image output-related operation of the object processing unit according to the sixth embodiment.

FIG. 18 is a flowchart showing the image output-related operation of the object processing unit 140e according to the sixth embodiment.

First, the image output synchronization unit 731 waits for receiving the preparation completion notification from one of the image output processing units 215 and 225 (Step S601). For example, when the image output synchronization unit 731 receives the preparation completion notification of the left-eye object image from the image output processing unit 215 (Step S601: Yes), the image output synchronization unit 731 compares the PTS included in the preparation completion notification with the reference clock supplied from the clock supply unit 732, to determine the image output scheduled time. The image output synchronization unit 731 then waits for receiving the preparation completion notification of the right-eye object image from the image output processing unit 225, until the image output scheduled time is reached (Step S602).

When the image output scheduled time is reached (Step S602: Yes) and the preparation completion notification is already received from the other one of the image output processing units 215 and 225 (the image output processing unit 225 in this example) (Step S603: Yes), the image output synchronization unit 731 issues the image output instruction to both the image output processing units 215 and 225. The image output processing units 215 and 225 respectively output the left-eye object image and the right-eye object image at the image output scheduled time (Step S607).

When the image output scheduled time is reached (Step S602: Yes) and the preparation completion notification is not received from the image output processing unit 225 (Step S603: No), the image output synchronization unit 731 waits during the time that the remaining period up to the image output of the next image is longer than the threshold (Step S604). In detail, the image output synchronization unit 731 waits until receiving the synchronization wait cancel notification from the synchronization wait determination unit 733.

When the image output preparation of the other image is completed (Step S603: Yes) during the wait (Step S604: Yes), the image output synchronization unit 731 issues the image output instruction to both the image output processing units 215 and 225. The image output processing units 215 and 225 respectively output the left-eye object image and the right-eye object image at the image output scheduled time (Step S607).

When the remaining period reaches the threshold without the preparation completion notification being issued from the image output processing unit 225 (Step S604: No), the synchronization wait determination unit 733 issues the synchronization wait cancel notification to the image output synchronization unit 731. The image output synchronization unit 731 accordingly issues the image output skip instruction to both the image output processing units 215 and 225 (Step S605). Having received the image output skip instruction, the image output processing units 215 and 225 respectively skip the image output of the left-eye object image and the right-eye object image corresponding to the image output scheduled time (Step S606). The image output processing units 215 and 225 also respectively clear data on the graphics planes 216 and 226.

The above processing (Steps 5601 to S607) is repeated until there is no image to be outputted next (Step S608).

Thus, the object processing unit 140e according to the sixth embodiment determines whether or not the image output preparation of one of the left-eye object image and the right-eye object image is completed by the predetermined image output scheduled time, by comparison with the reference clock.

When determining that the image output preparation of one of the left-eye object image and the right-eye object image is not completed by the predetermined image output scheduled time, the object processing unit 140e waits for the completion of the image output preparation of both the left-eye object image and the right-eye object image, during the time that the remaining period up to the image output of the next image is longer than the threshold. When the remaining period reaches the threshold without the completion of the image output preparation of both the left-eye object image and the right-eye object image, the object processing unit 140e skips the image output of both the left-eye object image and the right-eye object image. That is, the object processing unit 140e suppresses the image output of both the left-eye object image and the right-eye object image, and executes the processing of the next object image.

Figure 19:
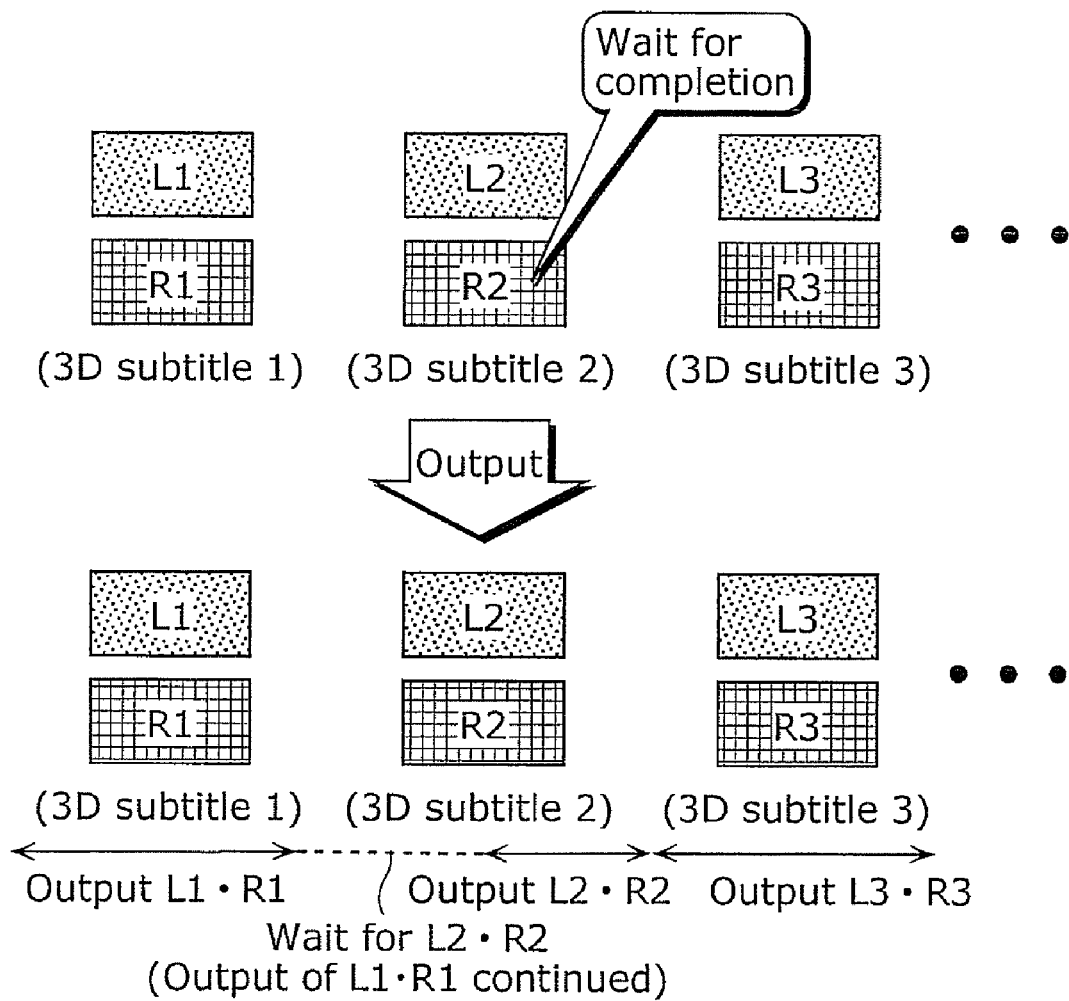
FIG. 19 is a schematic diagram showing images outputted when image output preparation is not completed, according to the sixth embodiment.

FIG. 19 is a schematic diagram showing images outputted when the image output preparation is not completed, according to the sixth embodiment.

A situation where the image output preparation of the right-eye object image R2 is not completed is described below, as shown in FIG. 19. When the image output preparation of the right-eye object image R2 is not completed, the object processing unit 140e waits to output the left-eye object image L2.

When the image output preparation of the right-eye object image R2 is completed within the predetermined period during which the remaining period up to the image output of the next left-eye object image L3 and the next right-eye object image R3 is longer than the threshold, the object processing unit 140e outputs the left-eye object image L2 and the right-eye object image R2. As a result, the left-eye object image L2 and the right-eye object image R2 are outputted during a period that is shorter than a period during which the left-eye object image L2 and the right-eye object image R2 are supposed to be outputted, as shown in FIG. 19. Note that, during the wait, the output of the left-eye object image L1 and the right-eye object image R1 is continued.

Thus, 3D display is maintained. This alleviates the viewer's discomfort that the object image is displayed in 2D.

As described above, when the image output preparation of one of the left-eye object image and the right-eye object image is not completed, the 3D video processor 100 according to the sixth embodiment waits for the completion of the image output preparation, for the predetermined period. When the image output preparation is completed within the predetermined period, the 3D video processor 100 according to the sixth embodiment outputs the left-eye object image and the right-eye object image. When the image output preparation is not completed until the predetermined period elapses, the 3D video processor 100 according to the sixth embodiment skips the image output of both the left-eye object image and the right-eye object image.

This contributes to a higher possibility that the image is outputted, and therefore alleviates the viewer's discomfort that information which is supposed to be provided is missing. Moreover, since the image output of both the left-eye object image and the right-eye object image is skipped when the image output preparation is not completed within the predetermined period, 3D display can be maintained. This alleviates the viewer's discomfort that the object image is displayed in 2D.

Although the 3D video processor and the 3D video processing method according to the present invention have been described by way of the above embodiments, the present invention is not limited to the above embodiments. Modifications obtained by applying various changes conceivable by those skilled in the art to the embodiments and any combinations of components in different embodiments are also included in the present invention without departing from the scope of the present invention.

Each of the above apparatuses is actually a computer system that includes a microprocessor, a ROM (Read Only Memory), a RAM, a hard disk unit, a display unit, a keyboard, a mouse, and the like. A computer program is stored on the RAM or the hard disk unit. Functions of each of the apparatuses can be achieved by the microprocessor operating in accordance with the computer program. The computer program mentioned here is a combination of a plurality of instruction codes that represent instructions to a computer for achieving predetermined functions.

The components that constitute each of the above apparatuses may be partly or wholly realized by one system LSI (Large Scale Integration). The system LSI is an ultra-multifunctional LSI produced by integrating a plurality of components on one chip, and is actually a computer system that includes a microprocessor, a ROM, a RAM, and the like. A computer program is stored on the RAM. Functions of the system LSI can be achieved by the microprocessor operating in accordance with the computer program.

The components that constitute each of the above apparatuses may be partly or wholly realized by an IC card or a single module that is removably connectable to the apparatus. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

The present invention may also be the method described above. The present invention may also be a computer program that realizes the method by a computer. The present invention may also be a digital signal including the computer program.

The present invention may also be a computer-readable recording medium, such as a flexible disk, a hard disk, a CD-ROM, an MO (Magneto-Optical Disk), a DVD (Digital Versatile Disc), a DVD-ROM, a DVD-RAM, a BD, or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The 3D video processor and the 3D video processing method according to the present invention have an advantageous effect of alleviating the viewer's discomfort, and are applicable, for example, to a digital television, a digital video recorder, and the like.

What is claimed is:

1. A three-dimensional (3D) video processor that outputs a left-eye object image and a right-eye object image which have parallax and are to be superimposed on a main video, said 3D video processor comprising:
a first image processor configured to perform first image output preparation of a first image and output the first image, the first image being one of the left-eye object image and the right-eye object image;
a second image processor configured to perform second image output preparation of a second image and output the second image, the second image being an other one of the left-eye object image and the right-eye object image; and
an image output controller configured to control said first image processor and said second image processor so that the first image and the second image are synchronously outputted,
wherein said first image processor includes a first determiner configured to determine whether the first image output preparation of the first image is completed,
said second image processor includes a second determiner configured to determine whether the second image output preparation of the second image is completed, and
said image output controller is configured to instruct said first image processor and said second image processor to skip the output of both the first image and the second image, when one of said first determiner and said second determiner determines that one of the first image output preparation and the second image output preparation of a corresponding one of the first image and the second image is not completed.

2. The 3D video processor according to claim 1,
wherein said first image processor includes a first plane memory, and is configured to perform the first image output preparation by rendering the first image on said first plane memory using a first header that includes first attribute information of the first image,
said second image processor includes a second plane memory, and is configured to perform the second image output preparation by rendering the second image on said second plane memory using a second header that includes second attribute information of the second image,
said first determiner is configured to determine that the first image output preparation of the first image is not completed, when a first error occurs in the first header, and
said second determiner is configured to determine that the second image output preparation of the second image is not completed, when a second error occurs in the second header.

3. The 3D video processor according to claim 2,
wherein said first determiner is configured to determine that the first image output preparation of the first image is not completed, when the first header does not conform to a predetermined specification, and
said second determiner is configured to determine that the second image output preparation of the second image is not completed, when the second header does not conform to the predetermined specification.

4. The 3D video processor according to claim 2,
wherein said first image processor is configured to output, instead of the first image, first erasure data for erasing a third image that remains rendered on said first plane memory, when skipping the output of the first image, and
said second image processor is configured to output, instead of the second image, second erasure data for erasing a fourth image that remains rendered on said second plane memory, when skipping the output of the second image.

5. The 3D video processor according to claim 2,
wherein said first image processor is configured to output a third image that remains rendered on said first plane memory, when skipping the output of the first image, and
said second image processor is configured to output a fourth image that remains rendered on said second plane memory, when skipping the output of the second image.

6. The 3D video processor according to claim 1,
wherein said first determiner is configured to, when determining whether the first image output preparation of the first image is completed, issue a first completion notification to said image output controller, the first completion notification indicating that the first image output preparation of the first image is completed,
said second determiner is configured to, when determining whether the second image output preparation of the second image is completed, issue a second completion notification to said image output controller, the second completion notification indicating that the second image output preparation of the second image is completed, and
said image output controller is configured to instruct said first image processor and said second image processor to skip the output of both the first image and the second image, when said image output controller does not receive one of the first completion notification and the second completion notification by a predetermined time.

7. The 3D video processor according to claim 6,
wherein, when said image output controller does not receive the one of the first completion notification and the second completion notification, said image output controller is configured to:

instruct said first image processor and said second image processor to output the first image and the second image, when said image output controller receives the one of the first completion notification and the second completion notification during a time when a remaining period until output of a next left-eye object image and a next right-eye object image is longer than a predetermined threshold; and instruct said first image processor and said second image processor to skip the output of both the first image and the second image, when said image output controller does not receive the one of the first completion notification and the second completion notification when the remaining period reaches the predetermined threshold.

8. The 3D video processor according to claim 7,
wherein the remaining period is half a period during which one of one left-eye object image and one right-eye object image is to be outputted.

9. The 3D video processor according to claim 1,
wherein the left-eye object image and the right-eye object image are each one of a subtitle, a symbol, a figure, and a menu image.

10. A 3D video processor that outputs a left-eye object image and a right-eye object image which have parallax and are to be superimposed on a main video, said 3D video processor comprising:
a first image processor configured to perform first image output preparation of a first image and output the first image, the first image being one of the left-eye object image and the right-eye object image;
a second image processor configured to perform second image output preparation of a second image and output the second image, the second image being an other one of the left-eye object image and the right-eye object image; and
an image output controller configured to control said first image processor and said second image processor so that the first image and the second image are synchronously outputted,
wherein said first image processor includes a first determiner configured to determine whether the first image output preparation of the first image is completed,
said second image processor includes a second determiner configured to determine whether the second image output preparation of the second image is completed, and
said image output controller is configured to instruct said first image processor to output a predetermined complementary image as the first image, when said first determiner determines that the first image output preparation of the first image is not completed and said second determiner determines that the second image output preparation of the second image is completed.

11. The 3D video processor according to claim 10,
wherein said first image processor includes a first plane memory, and is configured to perform the first image output preparation by rendering the first image on said first plane memory using a first header that includes first attribute information of the first image,
said second image processor includes a second plane memory, and is configured to perform the second image output preparation by rendering the second image on said second plane memory using a second header that includes second attribute information of the second image, said first determiner is configured to determine that the first image output preparation of the first image is not completed, when an error occurs in the first header,
said 3D video processor further comprises:
a header complementer configured to, when said first determiner determines that the error occurs in the first header, obtain the second header from said second image processor, the second attribute information included in the second header being the same as the first attribute information included in the first header, and
said first image processor is configured to, when said first determiner determines that the first image output preparation of the first image is not completed, render the complementary image on said first plane memory using the second header obtained by said header complementer, and output the complementary image as the first image.

12. The 3D video processor according to claim 11,
wherein said first determiner is configured to determine that the error occurs in the first header, when the first header does not conform to a predetermined specification.

13. The 3D video processor according to claim 10,
wherein said first determiner is configured to, when determining whether the first image output preparation of the first image is completed, issue a first completion notification to said image output controller, the first completion notification indicating that the first image output preparation of the first image is completed,
said second determiner is configured to, when determining whether the second image output preparation of the second image is completed, issue a second completion notification to said image output controller, the second completion notification indicating that the second image output preparation of the second image is completed, and
said image output controller is configured to instruct said first image processor to output, as the first image, the complementary image that is the second image, when said image output controller, after receiving the second completion notification, does not receive the first completion notification by a predetermined time.

14. The 3D video processor according to claim 13,
wherein said image output controller is further configured to determine whether one of the first image and the second image is erasure data for erasing a preceding image that remains rendered, and
said image output controller is configured to instruct said first image processor to output, as the first image, the erasure data that is the second image, when said image output controller, after receiving the second completion notification, does not receive the first completion notification by the predetermined time and determines that the second image is the erasure data.

15. A 3D video processing method of outputting a left-eye object image and a right-eye object image which have parallax and are to be superimposed on a main video, said 3D video processing method comprising:
performing first image output preparation of a first image and outputting the first image, the first image being one of the left-eye object image and the right-eye object image;
performing second image output preparation of a second image and outputting the second image, the second image being an other one of the left-eye object image and the right-eye object image; and controlling an output of both the first image and the second image so that the first image and the second image are synchronously outputted, wherein the first image output preparation of the first image includes determining whether the first image output preparation of the first image is completed, the second image output preparation of the second image includes determining whether the second image output preparation of the second image is completed, and the output of both the first image and the second image is skipped when it is determined that one of the first image output preparation and the second image output preparation of a corresponding one of the first image and the second image is not completed.

16. A 3D video processing method of outputting a left-eye object image and a right-eye object image which have parallax and are to be superimposed on a main video, said 3D video processing method comprising:

performing first image output preparation of a first image and outputting the first image, the first image being one of the left-eye object image and the right-eye object image;

performing second image output preparation of a second image and outputting the second image, the second image being an other one of the left-eye object image and the right-eye object image; and controlling the first image and the second image so that the first image and the second image are synchronously outputted, wherein the first image output preparation of the first image includes determining whether the first image output preparation of the first image is completed, the second image output preparation of the second image includes determining whether the second image output preparation of the second image is completed, and a predetermined complementary image is output as the first image when it is determined that the first image output preparation of the first image is not completed and the second image output preparation of the second image is completed.

17. A non-transitory computer-readable recording medium having a computer program recorded thereon for causing a computer to execute a 3D video processing method of outputting a left-eye object image and a right-eye object image which have parallax and are to be superimposed on a main video, the computer program causing the computer to execute:

performing first image output preparation of a first image and outputting the first image, the first image being one of the left-eye object image and the right-eye object image;

performing second image output preparation of a second image and outputting the second image, the second image being an other one of the left-eye object image and the right-eye object image; and controlling an output of both the first image and the second image so that the first image and the second image are synchronously outputted, wherein the first image output preparation of the first image includes determining whether the first image output preparation of the first image is completed, the second image output preparation of the second image includes determining whether the second image output preparation of the second image is completed, and the output of both the first image and the second image is skipped when it is determined that one of the first image output preparation and the second image output preparation of a corresponding one of the first image and the second image is not completed.

18. A non-transitory computer-readable recording medium having a computer program recorded thereon for causing a computer to execute a 3D video processing method of outputting a left-eye object image and a right-eye object image which have parallax and are to be superimposed on a main video, the computer program causing the computer to execute:

performing first image output preparation of a first image and outputting the first image, the first image being one of the left-eye object image and the right-eye object image;

performing second image output preparation of a second image and outputting the second image, the second image being an other one of the left-eye object image and the right-eye object image; and controlling the first image and the second image so that the first image and the second image are synchronously outputted, wherein the first image output preparation of the first image includes determining whether the first image output preparation of the first image is completed, the second image output preparation of the second image includes determining whether the second image output preparation of the second image is completed, and a predetermined complementary image is output as the first image when it is determined that the first image output preparation of the first image is not completed and the second image output preparation of the second image is completed.

\* \* \* \* \*